(12) United States Patent
Amick, Jr. et al.

(10) Patent No.: US 12,496,696 B2
(45) Date of Patent: Dec. 16, 2025

(54) TOOL ASSEMBLY AND ATTACHMENT APPARATUS FOR TOOL HEAD

(71) Applicant: Techtronic Cordless GP, Anderson, SC (US)

(72) Inventors: Ashley Bryan Amick, Jr., Simpsonville, SC (US); Graham Mitchell Schaafsma, Greenville, SC (US); Wei Quan Zheng, Dongguan (CN); Yu Liang Wang, Dongguan (CN)

(73) Assignee: TECHTRONIC CORDLESS GP, Anderson, SC (US)

( * ) Notice: Subject to any disclaimer, the term of this patent is extended or adjusted under 35 U.S.C. 154(b) by 0 days.

(21) Appl. No.: 18/244,137

(22) Filed: Sep. 8, 2023

(65) Prior Publication Data

US 2024/0083004 A1 Mar. 14, 2024

Related U.S. Application Data

(60) Provisional application No. 63/405,150, filed on Sep. 9, 2022.

(30) Foreign Application Priority Data

Nov. 9, 2022 (CN) .......................... 202211401316.2

(51) Int. Cl.
*B25D 17/00* (2006.01)
(52) U.S. Cl.
CPC .................................. *B25D 17/005* (2013.01)
(58) Field of Classification Search
CPC .................................................. B25D 17/005

USPC .......................................................... 285/33
See application file for complete search history.

(56) References Cited

U.S. PATENT DOCUMENTS

| 3,090,633 | A | | 5/1963 | Lawrence | |
|---|---|---|---|---|---|
| 4,971,161 | A | | 11/1990 | Godell | |
| 5,601,560 | A | * | 2/1997 | Del Rio | A61B 17/162 |
| | | | | | 408/231 |
| 6,135,461 | A | * | 10/2000 | Below | B25D 17/088 |
| | | | | | 279/38 |

(Continued)

FOREIGN PATENT DOCUMENTS

| AU | 2018206792 B2 | 3/2020 |
|---|---|---|
| CA | 2279560 A1 | 2/2001 |

(Continued)

*Primary Examiner* — Thomas M Wittenschlaeger
*Assistant Examiner* — Katie L Gerth
(74) *Attorney, Agent, or Firm* — Dority & Manning, P.A.

(57) ABSTRACT

A tool assembly and an attachment apparatus are provided, including a drive shaft extending along a longitudinal direction and forming a groove. A latch includes a notch configured to extend into the groove at the drive shaft. A coupler extends along the longitudinal direction and forms a cavity extending along the longitudinal direction. A tool end opening is formed at the first end of the coupler through which the drive shaft extends into the cavity along the longitudinal direction. The coupler forms a latch opening extending along the longitudinal direction and into the cavity. The latch is positioned in the cavity through the latch opening. A collar extends at least partially around the coupler. The collar is articulatable along the longitudinal direction around the latch opening.

21 Claims, 17 Drawing Sheets

(56) References Cited

U.S. PATENT DOCUMENTS

| | | | |
|---|---|---|---|
| 6,179,300 B1* | 1/2001 | Baumann | B23Q 3/12 279/82 |
| 6,543,789 B2* | 4/2003 | Frenzel | B25D 17/088 279/74 |
| 6,691,799 B2* | 2/2004 | Kuhnle | B23Q 3/12 173/132 |
| 6,820,700 B2 | 11/2004 | Funfer | |
| 7,073,797 B2 | 7/2006 | Gaul | |
| 7,114,584 B2 | 10/2006 | Burns | |
| 7,712,746 B2* | 5/2010 | Manschitz | B23Q 3/12 279/19 |
| 7,797,788 B2* | 9/2010 | Tong | A47L 5/30 15/323 |
| 8,459,658 B2 | 6/2013 | Cycon | |
| 8,505,893 B2 | 8/2013 | Haimer | |
| 8,511,941 B2 | 8/2013 | Curic et al. | |
| 8,720,606 B2 | 5/2014 | Mildren | |
| 8,844,940 B2 | 9/2014 | Wienhold | |
| 8,955,544 B2* | 2/2015 | Gurney | F16L 37/138 285/322 |
| 9,127,513 B2* | 9/2015 | Matthias | E21B 17/046 |
| 9,270,152 B2 | 2/2016 | Schamberget | |
| 9,517,510 B2 | 12/2016 | Zhang | |
| 10,343,266 B2 | 7/2019 | Zimmermann | |
| 10,689,909 B2 | 6/2020 | Wang | |
| 10,890,031 B2 | 1/2021 | Goren | |
| 10,898,959 B2 | 1/2021 | Haimer | |
| 10,933,473 B2 | 3/2021 | Haimer | |
| 11,065,744 B2 | 7/2021 | Zimmermann | |
| 11,090,785 B2 | 8/2021 | Singh | |
| 11,168,823 B2 | 11/2021 | Attiwell | |
| 11,224,923 B2 | 1/2022 | Stoker | |
| 11,280,134 B2 | 3/2022 | Puttmann | |
| 12,102,369 B2* | 10/2024 | Pedicini | A61B 17/164 |
| 2003/0025326 A1* | 2/2003 | Schulte | F24C 3/12 285/86 |
| 2006/0088393 A1* | 4/2006 | Cooper | B25F 3/00 408/239 R |
| 2007/0024013 A1 | 2/2007 | Hauptmann | |
| 2021/0190179 A1 | 6/2021 | Huang et al. | |
| 2021/0193413 A1 | 6/2021 | Huang | |
| 2022/0120141 A1 | 4/2022 | Huang et al. | |
| 2022/0127910 A1 | 4/2022 | Cao et al. | |
| 2024/0399551 A1* | 12/2024 | McConeghy | B25D 16/006 |

FOREIGN PATENT DOCUMENTS

| | | |
|---|---|---|
| CN | 103538033 B | 1/2014 |
| CN | 104057414 B | 9/2014 |
| CN | 105057722 B | 11/2015 |
| CN | 205000900 U | 1/2016 |
| CN | 205249763 U | 5/2016 |
| CN | 205840861 U | 12/2016 |
| CN | 304039856 | 2/2017 |
| CN | 206448768 U | 8/2017 |
| CN | 304248295 | 8/2017 |
| CN | 206790923 U | 12/2017 |
| CN | 304465334 | 1/2018 |
| CN | 304477361 | 1/2018 |
| CN | 105178871 B | 3/2018 |
| CN | 208966192 U | 6/2019 |
| CN | 106639862 B | 7/2019 |
| CN | 110449640 A | 11/2019 |
| CN | 209961515 U | 1/2020 |
| CN | 211360755 U | 8/2020 |
| CN | 211429995 U | 9/2020 |
| CN | 108782488 B | 10/2020 |
| CN | 110219585 B | 1/2021 |
| CN | 212674483 U | 3/2021 |
| CN | 212677683 U | 3/2021 |
| CN | 212696537 U | 3/2021 |
| CN | 212896251 U | 4/2021 |
| CN | 213195764 U | 5/2021 |
| CN | 213485634 U | 6/2021 |
| CN | 213519669 U | 6/2021 |
| CN | 215011503 U | 12/2021 |
| CN | 215453888 U | 1/2022 |
| CN | 216360985 U | 4/2022 |
| EP | 2395154 B1 | 12/2011 |
| EP | 3955454 A1 | 2/2022 |
| JP | H09125851 A | 5/1997 |

* cited by examiner

TOOL ASSEMBLY AND ATTACHMENT APPARATUS FOR TOOL HEAD

CROSS-REFERENCE TO RELATED APPLICATIONS

The present application claims priority to U.S. Provisional Patent Application 63/405,150 filed on Sep. 9, 2022, and Chinese Patent Application No. 202211401316.2 filed on Nov. 9, 2022, the disclosures of all of which are incorporated by reference herein in their entireties.

FIELD

The present subject matter is directed generally to tools, such as motorized tools or hand tools. Particular aspects of the present disclosure are directed to attachment devices for tool heads to connect to motorized or hand tools.

BACKGROUND

Tools are configured to receive tool bits, such as gas or electric-powered augers, drills, and machine tools. Various tools are configured for certain tasks and may include power units configured to output power for certain uses, such as for an auger attachment or a drill bit. However, mixing various tool heads with various power units may present operational, performance, or safety risks to the tool or the user. Combinations of tool heads and power units may result in insecure or insufficient coupling for the power or torque to be provided from the power unit.

BRIEF DESCRIPTION

Given the foregoing background, structures, and methods for attaching tool heads to power units are desired. More particularly, structures and methods for attaching tool heads to power units that provide robust coupling of the tool head to the tool, mitigate incomplete or insecure mechanical attachment of tool heads to tools, or mitigate operational, performance, and safety risks associated with mixing tool head and tool interfaces would be advantageous.

Aspects and advantages of the invention will be set forth in part in the following description, or may be understood from the description, or may be learned through practice of the invention.

An aspect of the present disclosure is directed to an attachment apparatus for a tool assembly. The exemplary apparatus defines a mutually orthogonal reference longitudinal direction, transverse direction, and lateral direction and a first end and a second end separated along the longitudinal direction. The exemplary apparatus includes a drive shaft extending along the longitudinal direction. The drive shaft forms a groove. A latch includes a notch configured to extend into the groove at the drive shaft. A coupler extends along the longitudinal direction. The coupler forms a cavity extending along the longitudinal direction. A tool end opening is formed at the first end through which the drive shaft extends into the cavity along the longitudinal direction. The coupler forms a latch opening extending along the longitudinal direction and into the cavity. The latch is positioned in the cavity through the latch opening. A collar extends at least partially around the coupler. The collar is articulatable along the longitudinal direction around the latch opening.

Another aspect of the present disclosure is directed to a tool assembly. The exemplary tool assembly defines a mutually orthogonal reference longitudinal direction, transverse direction, and lateral direction and a first end and a second end separated along the longitudinal direction. The exemplary tool assembly includes a power unit configured to output energy through an output shaft. A tool head includes a drive shaft extending along the longitudinal direction. The drive shaft forms a groove. A latch includes a notch configured to extend into the groove at the drive shaft. A coupler extends along the longitudinal direction and is connected to the output shaft of the power unit. The coupler forms a cavity extending along the longitudinal direction. A tool end opening is formed at the first end through which the drive shaft extends into the cavity along the longitudinal direction. The coupler forms a latch opening extending along the longitudinal direction and into the cavity. The latch is positioned in the cavity through the latch opening. A collar extends at least partially around the coupler, wherein the collar is articulatable along the longitudinal direction around the latch opening.

These and other exemplary features, aspects and advantages of the present invention will become better understood with reference to the following description and appended claims. The accompanying drawings, which are incorporated in and constitute a part of this specification, illustrate embodiments of the invention and, together with the description, serve to explain exemplary principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
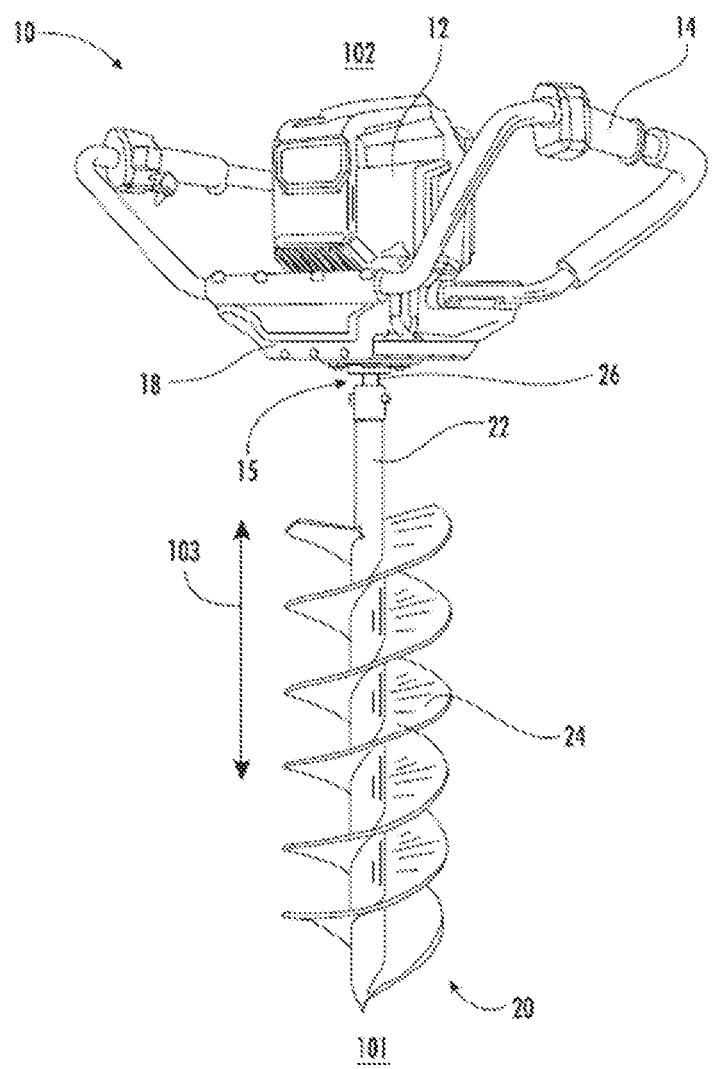
FIG. 1 depicts a perspective view of an exemplary embodiment of a tool assembly in accordance with aspects of the present disclosure.

Repeat use of reference characters in the present specification and drawings is intended to represent the same or analogous features or elements of the present invention.

It should be understood that the application is not limited to the details of construction and arrangement of components set forth in the following description or illustrated in the following drawings. The present disclosure can have other embodiments and can be put into practice or implemented in various ways. In addition, it should be understood that the phraseology and terminology used herein are for the purpose of description and may not be regarded as limiting.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

Embodiments of an attachment apparatus for a tool are provided. Embodiments provided herein provide attachment and retention mechanisms that allow selective tool heads to operably couple to a tool. Apparatuses providing selective attachment and retention of tool heads to tools may provide robust coupling of the tool head to the tool, mitigate incomplete or insecure mechanical attachment of tool heads to tools, and mitigate operational, performance, and safety risks associated with mixing tool head and tool interfaces.

Referring now to the drawings, FIG. 1 provides an exemplary embodiment of a tool assembly 10 with a tool head 20. FIGS. 2-6 provide views of an exemplary embodiment of a connecting device or an attachment apparatus 100 configured to operably couple the tool head 20 (e.g., an auger attachment, drill bit, or other machine tool bit) to the tool assembly 10. In various embodiments, the tool head 20 includes a shank or shaft 22 extending along a longitudinal direction 103. A tool surface 24 extends from the shaft 22, such as blades, grooves, or other tool members. In some embodiments, tool head 20 may form an auger attachment. Tool assembly 10 may include a power unit 12 configured to output energy or torque to the tool head 20. Tool assembly 10 may generally include a handle 14 at which a user holds, operates, and controls the tool assembly 10. An attachment interface 15 is formed at a junction at which tool assembly 10 and tool head 20 couple to one another. In some embodiments, embodiments of apparatus 100 are formed or positioned at attachment interface 15 at which tool head 20 and tool assembly 10 operably couple to one another.

Referring to FIGS. 1-6, a reference longitudinal direction 103 extends co-directional to an extension of the tool head 20, or particularly an extension of shaft 22 of tool head 20, between a first end 101 and a second end 102. Longitudinal direction 103 may form an axis of extension of shaft 22 or coupler shaft 110 provided further herein. First end 101 forms a tool end at which a tool head 20 is configured to interface with a surface, object, member, or other worked surface (e.g., the ground at which an auger may dig into). Tool head 20 is configured to receive motive energy or torque from power unit 12 (which may include, e.g., a motor for driving a tool head and a power supply, such as a battery or gas-powered engine). Second end 102 forms a handling end at which a user may hold and operate the tool assembly 10. Lateral direction 105 and transverse direction 104 are each formed orthogonal to longitudinal direction 103. Accordingly, longitudinal direction 103, transverse direction 104, and lateral direction 105 are mutually orthogonal to one another. Lateral direction 105 and transverse direction 104 may each extend from a centerline formed along longitudinal direction 103 through coupler shaft 110. A radial direction may generally extend from the centerline formed through coupler shaft 110.

Referring to FIGS. 2-6, embodiments of apparatus 100 include a connector, coupler, or coupler shaft 110 releasably coupled to an output shaft 16 of the tool assembly 10. A drive shaft 26 is releasably coupled to the coupler shaft 110. In various embodiments, drive shaft 26 forms a portion of the tool head 20. In some embodiments, drive shaft 26 forms a shaft extending from the shank or shaft 22 at which tool surface 24 is formed or extended. Coupler shaft 110 extends along the longitudinal direction 103. Coupler shaft forms a hollow or inner cavity 112 extending along the longitudinal direction 103. Coupler shaft 110 forms cavity 112 to permit extension of drive shaft 26 along the longitudinal direction 103 into cavity 112. In some embodiments, coupler shaft 110 forms cavity 112 to permit extension of drive shaft 26 into cavity 112 along the longitudinal direction 103 from the first end 101 toward the second end 102.

In still some embodiments, coupler shaft 110 includes a body 114 extending along the longitudinal direction 103. In some embodiments, body 114 forms a substantially cylindrical body extending along the longitudinal direction 103. It should be appreciated that body 114 may include walls, recesses, grooves, or surfaces extended from body 114. A tool end opening 116 is formed proximate to the first end 101 and configured to receive drive shaft 26 along the longitudinal direction 103.

Coupler shaft 110 forms a latch opening 118 providing access to cavity 112 along the lateral direction 105. Latch opening 118 is formed to allow a latch 120 to insert through coupler shaft 110 into cavity 112. In some embodiments, opening 118 is formed through a longitudinally extended portion of body 114. In still some embodiments, opening 118 extends along longitudinal direction 103, such as to form a longitudinally extended slot into cavity 112.

Latch 120 forms a member extending along the longitudinal direction 103. Latch 120 is configured to be positioned through opening 118 into cavity 112. In various embodiments, latch 120 includes an engaging portion or notch 122 extending along the lateral direction 105. In some embodiments, notch 122 extends along the lateral direction 105 from a first latch end 125 proximate along the longitudinal direction 103 to the first end 101. Latch 120 may further form a second latch end 124 proximate along the longitudinal direction 103 to the second end 102. In some embodiments, latch 120 forms the second latch end 124 to extend within cavity 112 and inward along the lateral direction 105 from a second coupler end portion 115. In some embodiments, the second coupler end portion 115 forms a portion of the coupler shaft 110 along the longitudinal direction 103 and positioned proximate to the second end 102 from opening 118. A first coupler end portion 113 forms a portion of the coupler shaft 110 along the longitudinal direction 103 and positioned proximate to the first end 101 from opening 118. In various embodiments, notch 122 is positioned adjacent along the longitudinal direction 103 of the first coupler end portion 113. It should be appreciated that the first latch end 125 is proximate to the first end 101 in contrast to the second latch end 124. Furthermore, second latch end 124 is proximate to the second end 102 in contrast to the first latch end 125.

Figure 2:
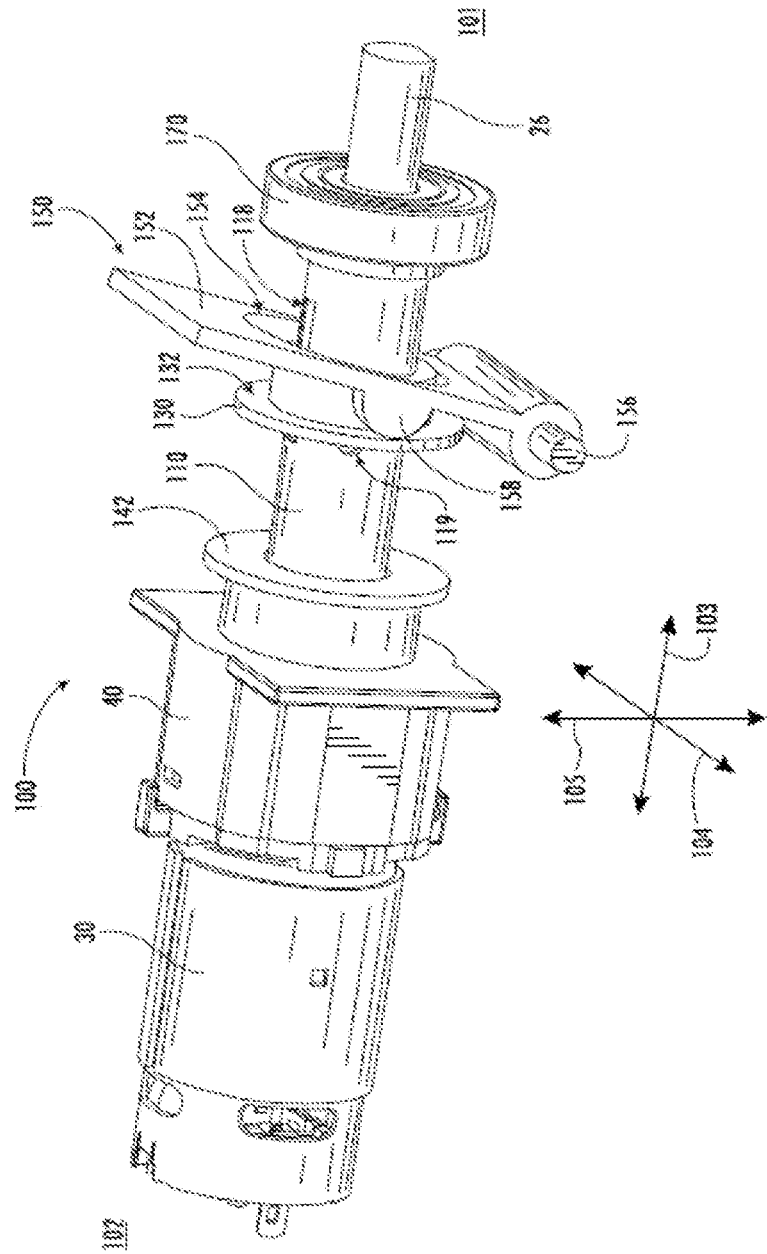
FIG. 2 depicts a perspective view of an exemplary embodiment of an attachment apparatus for a tool assembly in accordance with aspects of the present disclosure.
Figure 3:
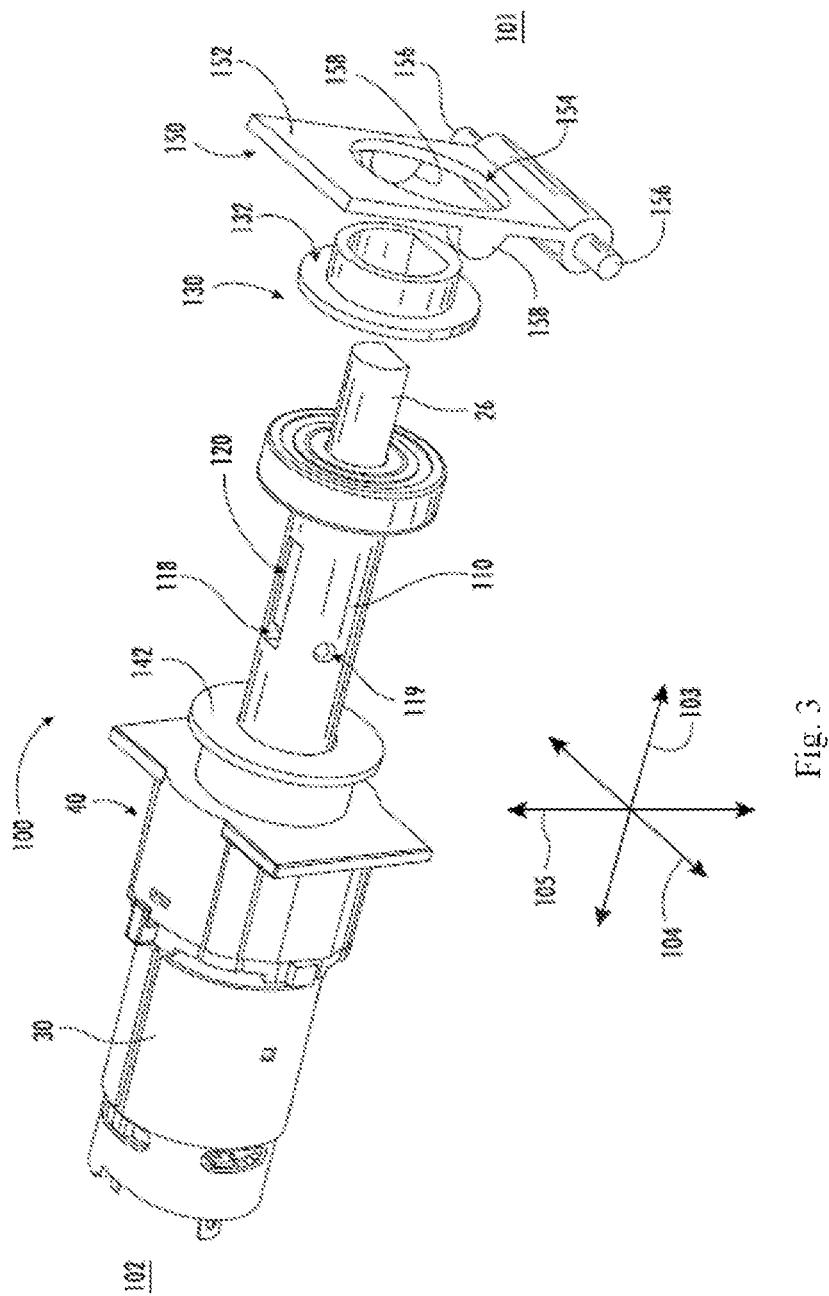
FIG. 3 depicts an exploded perspective view of an embodiment of an attachment apparatus in accordance with aspects of the present disclosure.
Figure 4:
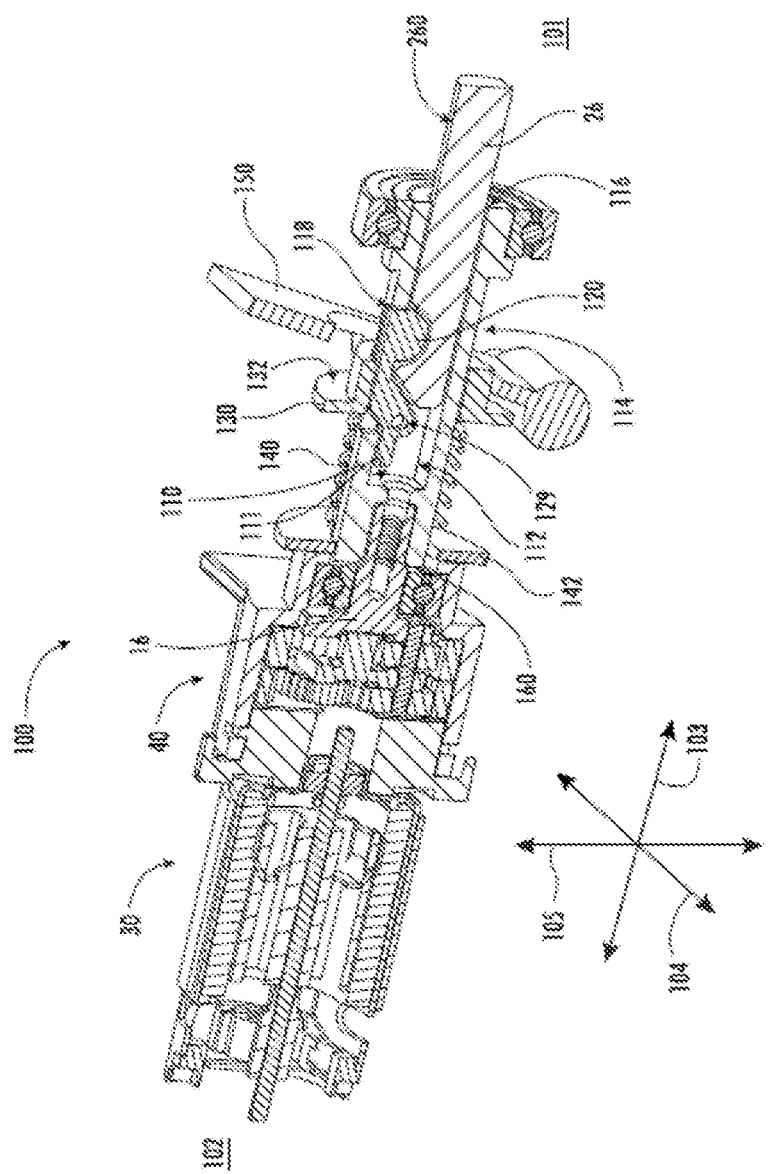
FIG. 4 depicts a cutaway perspective view of an embodiment of an attachment apparatus in accordance with aspects of the present disclosure.
Figure 5:
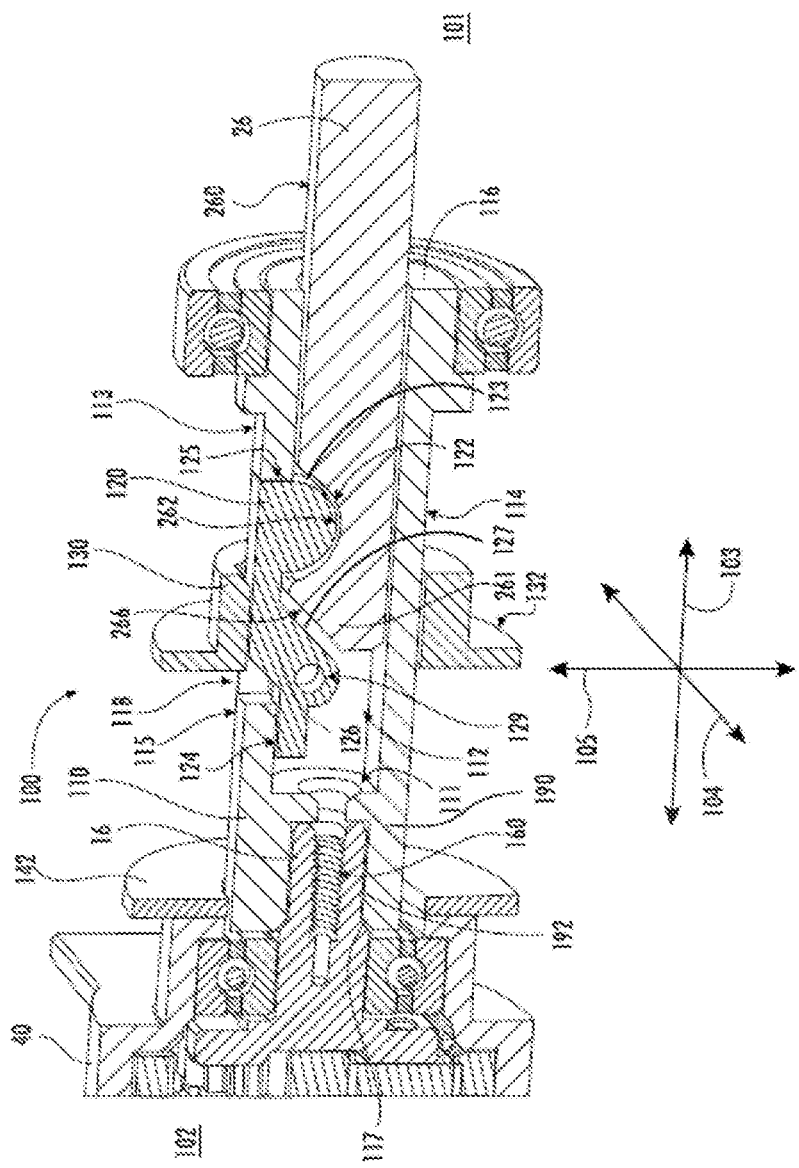
FIG. 5 depicts a cutaway perspective view of an embodiment of an attachment apparatus in accordance with aspects of the present disclosure.

Referring still to FIGS. 2-6, and more particularly depicted in the embodiments depicting cross sectional views in FIGS. 4-5, various embodiments of latch 120 may include an arm 126 extending at least partially along the lateral direction 105. Arm 126 may form a transition portion of latch 120 positioned between notch 122 and second latch end 124. In some embodiments, arm 126 extends along lateral direction 105 and positions second latch end 124 within cavity 112 inward along the lateral direction 105 of second coupler end portion 115.

In various embodiments, drive shaft 26 forms a groove 262 configured to receive notch 122 at latch 120. In some embodiments, groove 262 is formed extending substantially along lateral direction 105 from the outer surface 260. Drive shaft 26 may form a drive shaft second end portion 266 extending at least partially along the lateral direction 105. For example, drive shaft second end portion 266 corresponds substantially in form to arm 126 at latch 120. In some embodiments, each of arm 126 and portion 266 extend at an acute angle between the lateral direction 105 and longitudinal direction 103. Accordingly, portion 266 may be formed to position along the longitudinal direction 103 between notch 122 and arm 126. As further described herein, groove 262 formed into drive shaft 26 is configured to receive notch 122 at latch 120 with drive shaft 26 extended into cavity 112. Notch 122 positioned within groove 262 within cavity 112 limits movement of drive shaft 26 along the longitudinal direction 103.

Referring to FIGS. 2-3, coupler shaft 110 may form an opening 119 extending along transverse direction 104. Referring to FIGS. 4-5, latch 120 may form an opening 129 extending along transverse direction 104. Referring to FIGS. 2-6, openings 119, 129 are configured to correspond to one another, such as to align along the longitudinal direction 103. Openings 119, 129 aligned along the longitudinal direction 103 allow a shaft, pin, rod, shank, fastener, or other member to extend through openings 119, 129. Openings 119, 129 may allow latch 120 to pivot within cavity 112. In particular, a member extending through openings 119, 129 may allow latch 120 to pivot at opening 129 to selectively articulate notch 122 along the lateral direction 105. In some embodiments, opening 129 is positioned along the longitudinal direction 103 between second latch end 124 and notch 122. In some embodiments, opening 129 is positioned at arm 126, or at an end of arm 126, such as to allow latch 120 to pivot at opening 129 as described herein.

Referring still to FIGS. 2-6, a drive part, sleeve, or collar 130 extends around coupler shaft 110. In various embodiments, collar 130 may extend circumferentially around coupler shaft 110. Collar 130 is translatable along longitudinal direction 103. Collar 130 is translatable along longitudinal direction 130, such as to selectively surround latch 120. Collar 130 surrounding latch 120 retains drive shaft 26 within coupler shaft 110. In some embodiments, collar 130 surrounding latch 120 retains or constricts movement of notch 122 at latch 120 in groove 262 at drive shaft 26. Notch 122 within groove 262 retains drive shaft 26 within cavity 112 and limits or prevents movement of drive shaft 26 along the longitudinal direction 103.

Referring still to FIGS. 2-6, a motor 30 is configured to output energy to rotate coupler shaft 110. In some embodiments, a transmission assembly 40 is operably coupled between motor 30 and coupler shaft 110. Transmission assembly 40 may be configured to receive energy from motor 30 and convert the energy to torque that may rotate coupler shaft 110. Motor 30 may include any appropriate power unit configured to output energy to rotate output shaft 16. Transmission assembly 40 may include any appropriate type of torque converter, including one having one or more gear assemblies, configured to receive energy from motor 30 and output energy and torque through coupler shaft 110. In some embodiments, power unit 12 of tool assembly 10 includes motor 30 and transmission assembly 40. However, in certain embodiments, power unit 12 may include a hand-driven power apparatus configured to transmit power from a user to a tool head.

In some embodiments, such as those depicted in cross-sectional views of embodiments of a portion of tool assembly 10 including apparatus 100 provided in FIGS. 3-4, transmission assembly 40 may include output shaft 16 from which torque and energy is transmitted to coupler shaft 110. In various embodiments, output shaft 16 includes a threaded interface 160 configured to receive a mechanical fastener (e.g., generally a threaded shank and head, or screw, or bolt, or tie rod, etc. omitted for clarity). In some embodiments, the threaded interface 160 extends along the longitudinal direction 103. Coupler shaft 110 may include a wall 111 extending along the lateral direction 105 within cavity 112. Coupler shaft 110 forms an output shaft opening 117 proximate to the second end 102 along the longitudinal direction 103 (i.e., distal to tool end opening 116 proximate to the first end 101 along the longitudinal direction 103). Output shaft opening 117 allows output shaft 16 to enter cavity 112 along the longitudinal direction 103. Wall 111 is positioned between openings 116, 117 such as to allow output shaft 16 to extend into cavity 112. Output shaft 16 may particularly extend along the longitudinal direction 103 and abut wall 111 within cavity 112.

A mechanical fastener is allowed to enter cavity 112 through opening 116. A threaded end of the mechanical fastener is allowed to extend through wall 111 and mate with threaded interface 160 at output shaft 16. A head of the threaded fastener may be configured to abut with wall 111, such as to fasten coupler shaft 110 to output shaft 16. In assembly, the mechanical fastener is extended along the longitudinal direction 103 through wall 111 within cavity 112 and fastened to output shaft 16 at interface 160. Latch 120 may then be positioned at least partially within cavity 112 to allow openings 119, 129 to align such that a mechanical fastener, such as a pin rod, shank, shaft, etc., may extend along the transverse direction 104 through openings 119, 129 to secure latch 120 to coupler shaft 110. Latch 120 may desirably and selectively rotate notch 122, such as substantially along lateral direction 105. Drive shaft 26 is extended along the longitudinal direction 103 through opening 116 into cavity 112. Latch 120 may rotate notch 122 at least partially out of cavity 112 to allow drive shaft 26 to position along the longitudinal direction 103 to allow notch 122 to align and position within groove 262 at drive shaft 260.

In various embodiments, collar 130 is positioned around coupler shaft 110. In some embodiments, collar 130 is translated along the longitudinal direction 103 from second end 102 toward first end 101. Coupler shaft 110 may be attached to output shaft 16 with collar 130 positioned around coupler shaft 130.

Referring to FIG. 4, in some embodiments, an elastic part or spring 140 is positioned between collar 130 and transmission assembly 40. In some embodiments, spring 140 extends along the longitudinal direction 103 and reacts against collar 130 and a stop portion or surface 142 extending around coupler shaft 110 at or proximate to the second end 102. Surface 142 may form a washer, plate, or wall extending radially outward from coupler shaft 110. Surface 142 may be positioned adjacent along longitudinal direction 103 to transmission assembly 40. Spring 140 may apply a force to bias collar 130 along the longitudinal direction 103 over opening 118. Accordingly, collar 130 may be biased to retain latch 120 within opening 118.

In some embodiments, collar 130 may form a tight fit interface in which friction between collar 130 and coupler shaft 110 or latch 120 retains collar 130 over opening 118. A user may apply a force, such as force along the longitudinal direction 103 toward the second end 102, to selectively move collar 130 and allow notch 122 at latch 120 to rotate in and out of groove 262 at drive shaft 260.

Referring to FIGS. 1-6, in various embodiments, apparatus 100 includes member 150 configured to receive a force substantially along longitudinal direction 103 to selectively act against collar 130 to translate collar 130 along the longitudinal direction 103. Member 150 may form a fork or lever including a wall 152 extending around coupler shaft 110. Wall 152 forms an opening 154 through which coupler shaft 110 extends along the longitudinal direction 103. Member 150 may form a contact protrusion or notch 158 extending substantially along the longitudinal direction 103. Notch 158 is configured to contact a radially outwardly extending wall 132 at collar 130. Notch 158 may be formed extending from wall 152 along the longitudinal direction 103 toward second end 102.

Figure 6:
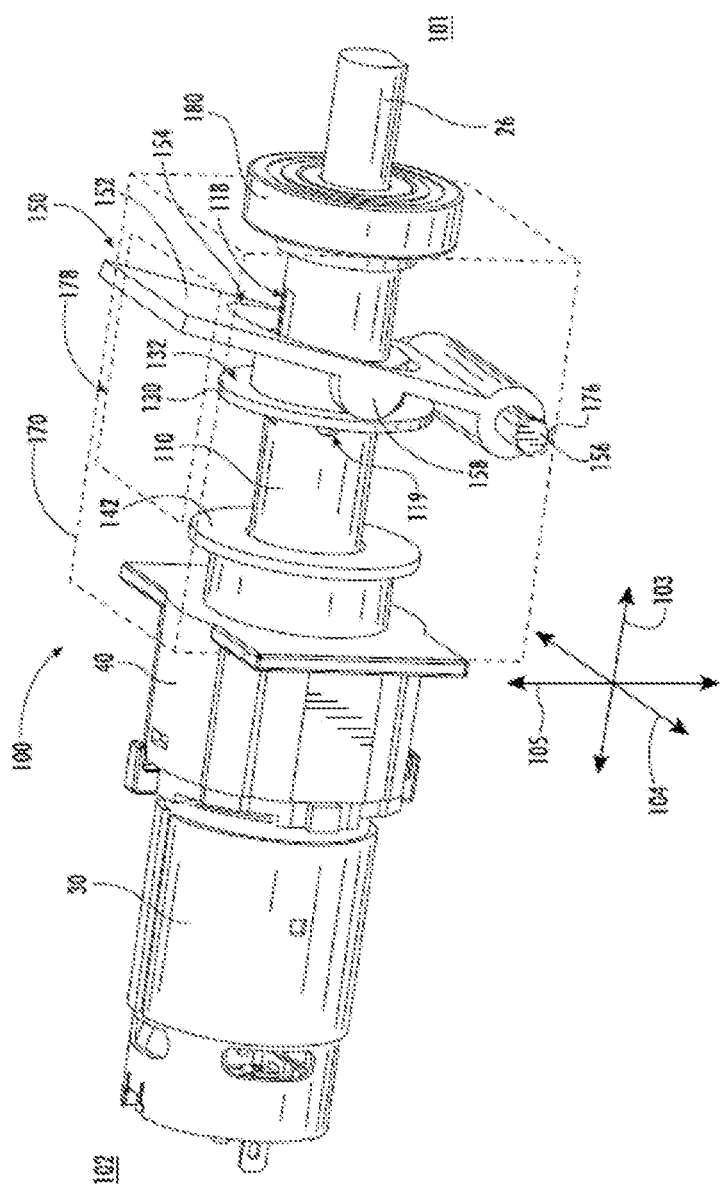
FIG. 6 depicts a perspective view of an embodiment of an attachment apparatus in accordance with aspects of the present disclosure.

In some embodiments, member 150 forms a pin 156 configured to position and rotate within a housing surrounding at least a portion of coupler shaft 110. Referring to FIG. 6, an embodiment of apparatus 100 is provided including a housing 170 surrounding coupler shaft 110. Housing 170 may include a plurality of walls configured to substantially surround coupler shaft 110 and components connected to coupler shaft 110. In some embodiments, housing 170 forms a portion of a casing 18 (FIG. 1) of tool assembly 10. Handle(s) 14 may extend from casing 18 and form grips or control surfaces at which a user interacts and uses tool assembly 10. Housing 170 may form a pin opening 176 at which pin 156 at member 150 is positioned. Pin 156 at pin opening 176 may allow member 150 to pivot toward first end 101 and second end 102. Housing 170 may form a member opening 178 to allow a portion of member 150 to extend out of housing 170.

In an exemplary method of operation, a user may apply a force to member 150 such that member 150 pivots about pin 156 and contacts collar 130 (e.g., at notch 158) and displaces collar 130 along the longitudinal direction 103. In some embodiments, a user may contact an end of member wall 152 distal to pin 156. The distal end of member wall 152 may extend out of housing 170 through member opening 178. Member 150 may act as a lever or moment arm facilitating easier articulation of collar 130 along the longitudinal direction 103 by a user.

Member opening 178 may form a slot extending along the longitudinal direction 103, such as to allow member 150 to pivot toward the second end 102 and the first end 101. Notches 158 at member 150 may particularly contact wall 132 at collar 130. Force applied by a user may transfer through notch 158 to collar 130 and cause collar 130 to translate toward the second end 102. Translation of collar 130 along the longitudinal direction 103 toward second end 102 allows latch 120 to freely rotate (e.g., about the pin, fastener, etc. in opening 129) out of groove 262 away from drive shaft 260. In some embodiments, a user may pull or slide drive shaft 26 along the longitudinal direction 103 toward first end 101 when collar 130 is displaced toward second end 102 and away from opening 118. Collar 130 displaced from around latch 120 may allow latch 120 to rotate upward along the lateral direction 105 when drive shaft 26 is translated along the longitudinal direction 103 toward the first end 101. For example, the portion of groove 262 positioned toward end 102 may contact notch 122. Groove 262 may force notch 122 along lateral direction 105 as drive shaft 26 is pulled along longitudinal direction 103 away from second end 102. Corresponding sloped surfaces at groove 262 and notch 122 may force notch 122 at latch 120 along lateral direction 105 as drive shaft 26 is translated along longitudinal direction 103 toward first end 101. In various embodiments, the groove may be a semicircular groove, and the engaging protrusion may be a semicircular protrusion.

In various embodiments, spring 140 may push collar 130 along the longitudinal direction 103 toward the first end 101 over opening 118 when a counteracting force applied to collar 130 (e.g., through member 150) is decreased or removed. Collar 130 may contact latch 120 to rotate latch 120 into cavity 112. Collar 130 may contact and rotate notch 122 at latch 120 into groove 262 when drive shaft 26 is positioned accordingly in cavity 112. Referring to exemplary embodiments depicted in FIGS. 4-5, collar 130 may secure or lock latch 120 into position at groove 262 and latch 120 may lock drive shaft 26 into position along the longitudinal direction 103. Embodiments such as depicted or described herein may prevent coupling of unsafe tool heads to tool assembly 10, such as in contrast to tool coupling ends without mating surfaces at latch 120.

Referring to the FIGS. 11 to 17, in various embodiments, latch 120 includes a latch protrusion 155. When the actuating part 150 drives the drive part 130 to move from the initial position to the released position, the drive part 130 drives the latch protrusion 155 to drive the latch 120 to move from the locked position to the unlocked position. Cooperation between the latch projection 155 and the drive part 130 (e.g., a sleeve or collar) may allow latch 120 to be easily driven to pivot between the locked position and the unlocked position.

Figure 15:
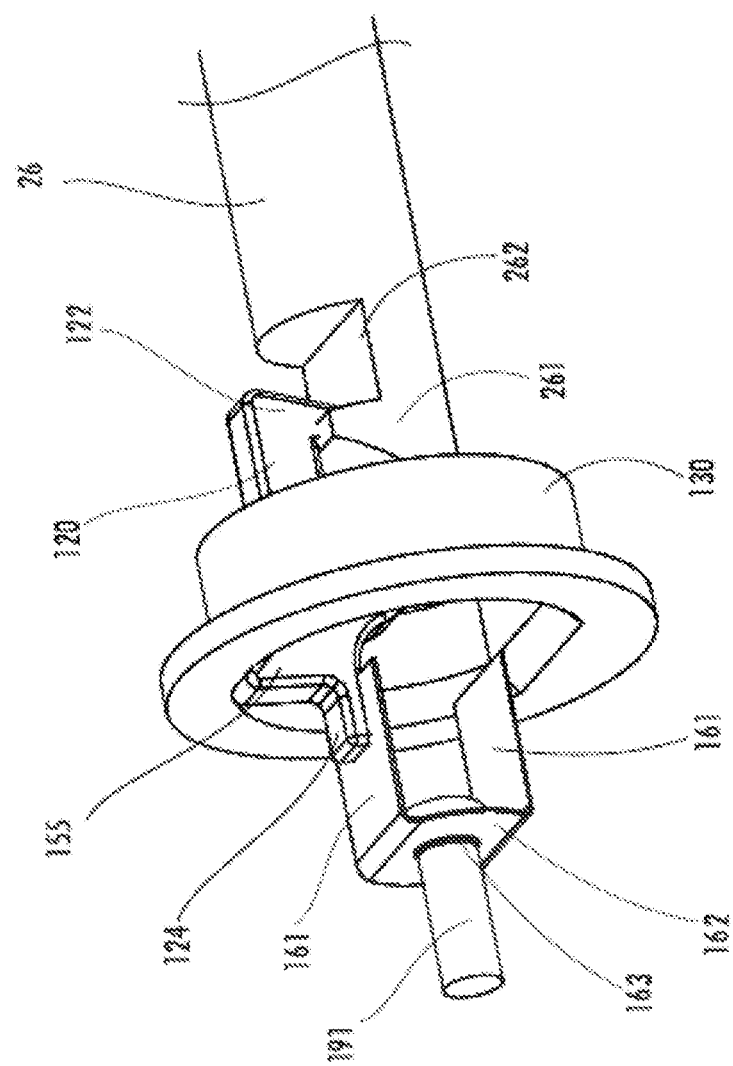
FIG. 15 depicts a perspective view of FIG. 14 in accordance with aspects of the present disclosure, with the connector removed.
Figure 16:
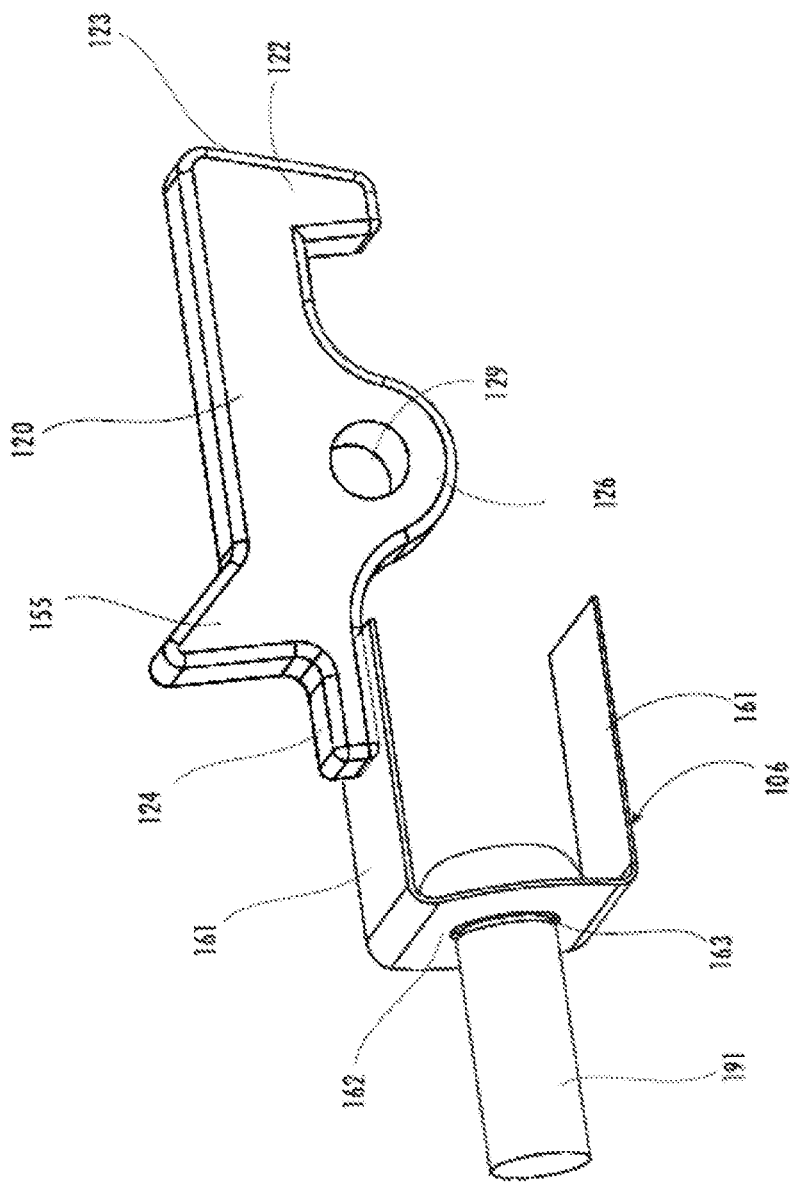
FIG. 16 depicts a perspective view of FIG. 15 in accordance with aspects of the present disclosure, with the drive part and a part of the drive shaft removed.

Referring to FIGS. 15-16, in some embodiments, a second elastic part 106 acting on the latch 120 is provided in the inner cavity 112. When the latch 120 moves from the locked position to the unlocked position, the latch 120 abuts the second elastic part 106. For example, the second latch end or stop end 124 of the latch 120 abuts the second elastic part 106 such that the second elastic part 106 stores energy. When the external force applied to the actuating part is removed, the second elastic part 106 releases energy and biases the latch 120 to the locked position. As such, automatic return of the latch may be achieved by the second elastic part 106 in the inner cavity 112.

Figure 17:
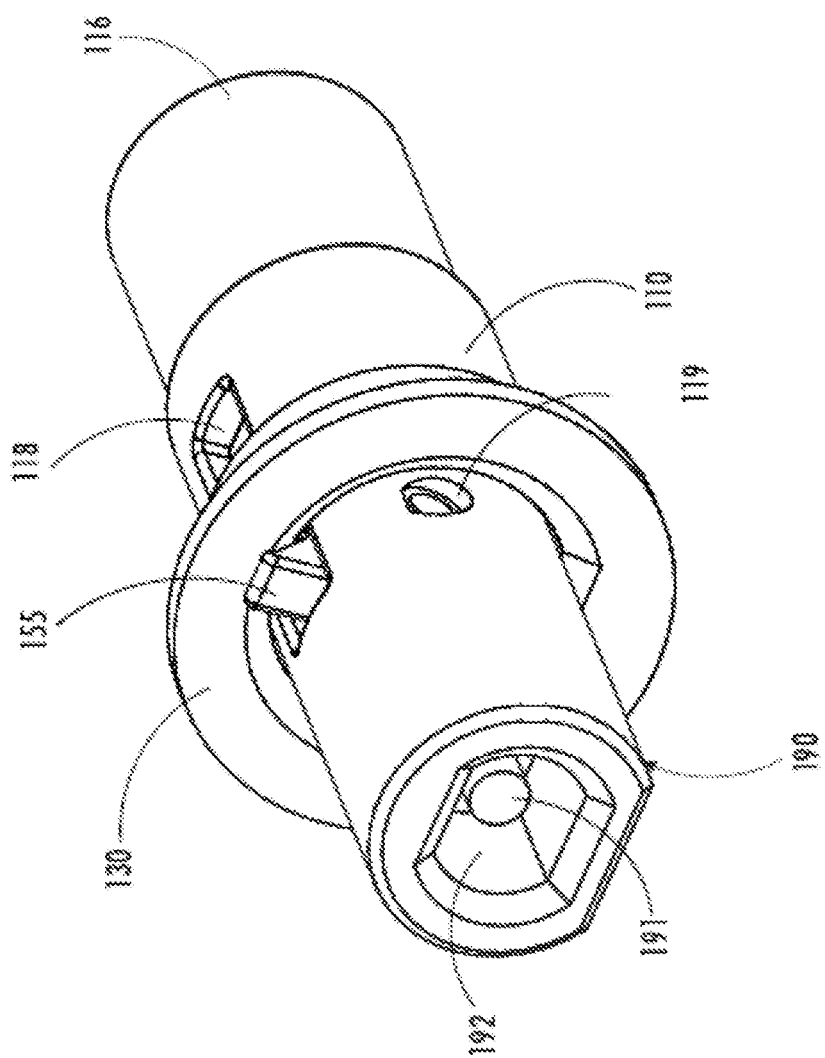
FIG. 17 depicts a perspective view of the connecting device of FIG. 14 in accordance with aspects of the present disclosure, wherein a part of the drive shaft is removed.

Referring to FIGS. 15-17, in some embodiments, the connector power input end 190 of the coupler shaft or connector 110 has a connecting part 191, and the connecting part 191 is configured to securely connect the connector power input end 190 to an upstream power output end, for example, an output shaft 16, wherein a part of the second elastic part 106 serves as the connecting gasket of the connecting part 191. In this way, the second elastic part 106 drive the latch 120 to return automatically, or additionally, provide a connecting gasket for the connecting part 191 that connects the connector to the power output end, such as the output shaft 16, upstream of the power transmission. As such, reliability of the connection of the connecting part 191 may be improved and the use of other additional connecting gaskets or washers may be avoided.

In various embodiments, the second elastic part 106 may be of a plurality of structural types. For example, in one structural type, the second elastic part 106 is an L-shaped elastic part, one wall of the L-shaped elastic part abuts the latch, and the other wall forms a connecting gasket of the connecting part 191. For another example, referring to FIGS. 15-16, the second elastic part 106 is a U-shaped elastic piece. A first elastic side wall 161 of the U-shaped elastic piece acts on the stop end 124 of the latch 120, and a second elastic side wall 161 of the U-shaped elastic piece is used as a supporting side wall, such as to improve the stability of installation of the second elastic part 106 in the inner cavity 112. A bottom wall 162 of the U-shaped elastic piece may be used as the connecting gasket. A mounting hole 163 is formed on the bottom wall. The connecting part 191 passes through the mounting hole 163 and extends toward the second end along the longitudinal direction in the inner cavity 112.

Referring to FIG. 5 and FIG. 17, in some embodiments, an accommodating channel 192 is formed on an end surface of the connector power input end 190. The accommodating channel is configured to accommodate or receive a power output shaft 16 upstream of the power transmission. A through hole is formed on a spacer side wall 111 between the accommodating channel 192 and the inner cavity 112. The connecting part 191 extends from the inner cavity 112 through the through hole into the accommodating channel 192 to connect to the power output shaft 16, such that the connector 110 and the power output shaft 16 are connected to each other. The connecting part 191 may be a bolt, a screw, or other threaded fastener and cooperates with the threaded interface or connection 160 to fasten the output shaft 16 in the accommodating channel 192, such as to securely connect the output shaft 16 and the connector 110.

Referring to FIG. 6, in some embodiments, the actuating part 150 is configured to protrude from the actuator opening 178 on the housing 170 of the tool to form a protruding end.

Figure 8:
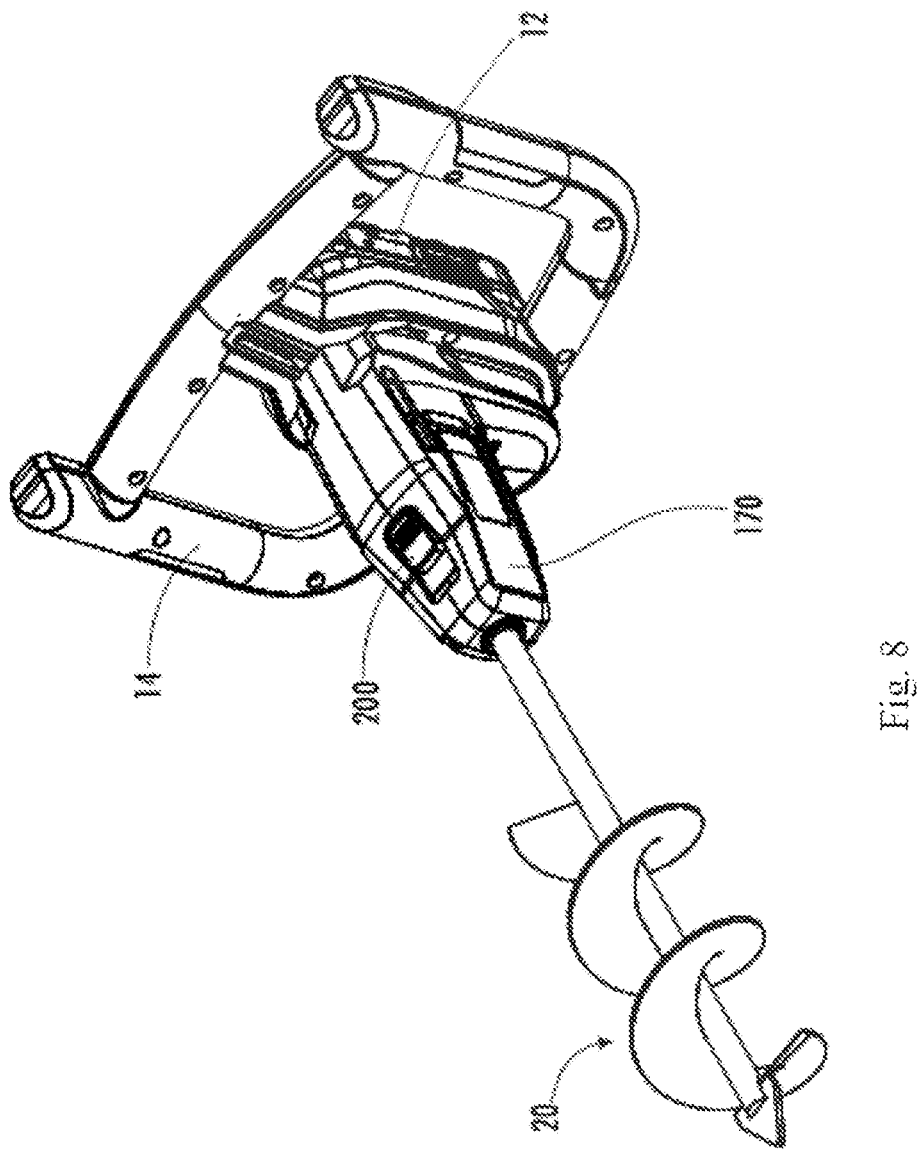
FIG. 8 depicts a perspective view of a second embodiment of the tool in accordance with aspects of the present disclosure.
Figure 9:
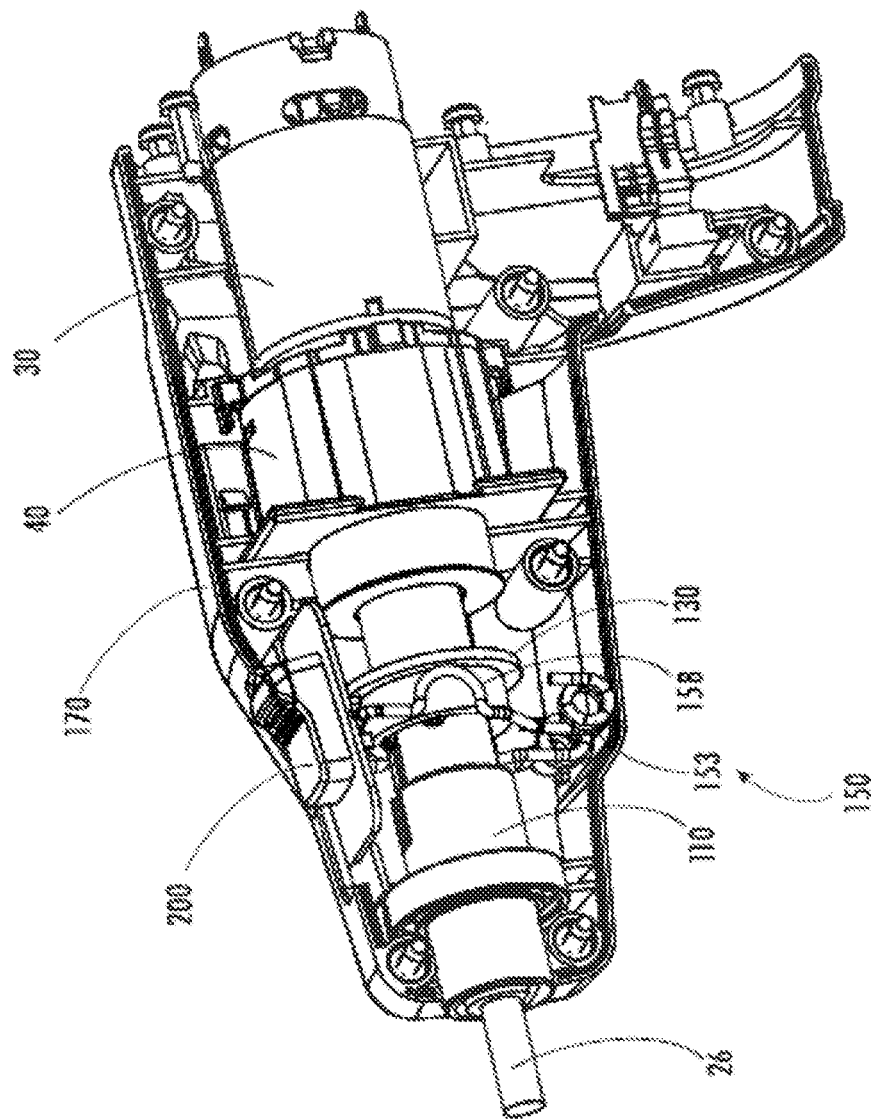
FIG. 9 depicts a perspective view of the tool of FIG. 8 in accordance with aspects of the present disclosure, with a part of the housing and the tool head removed.
Figure 10:
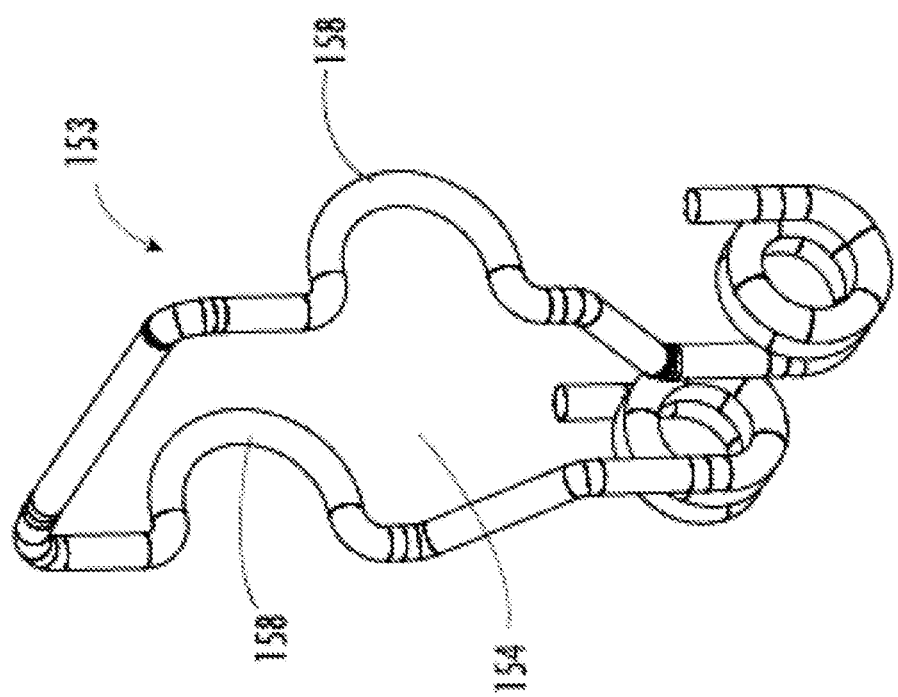
FIG. 10 depicts a perspective view of the elastic actuating part in FIG. 9 in accordance with aspects of the present disclosure.
Figure 11:
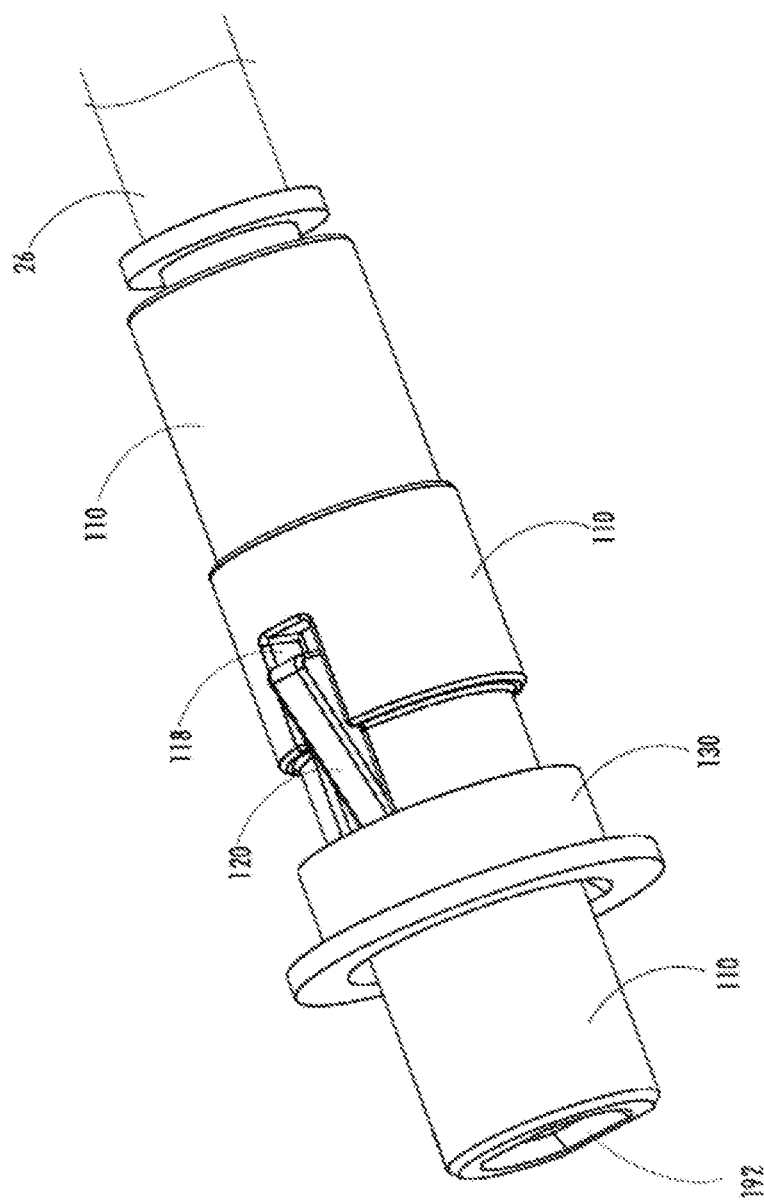
FIG. 11 depicts a perspective view of a second embodiment of the connecting device of the tool assembly in accordance with aspects of the present disclosure, wherein a part of the drive shaft of the tool head is shown, and wherein the latch is in the unlocked position.
Figure 12:
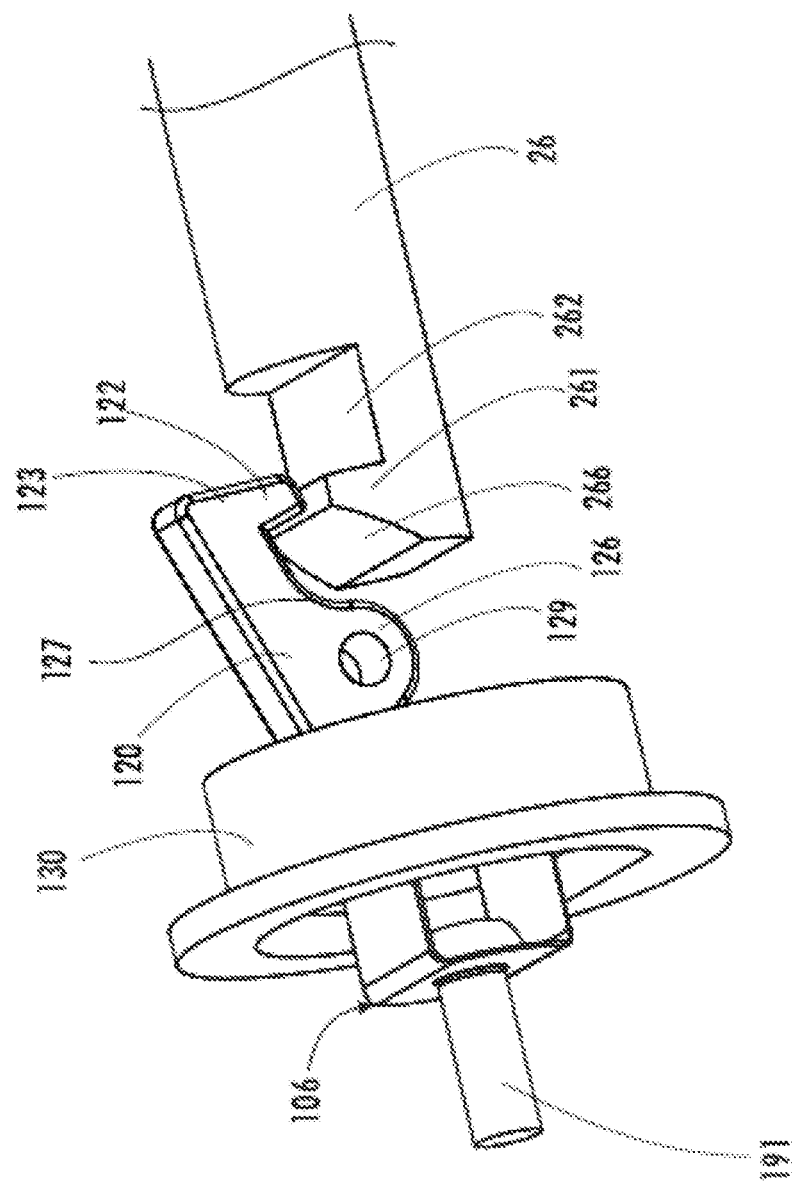
FIG. 12 depicts a perspective view of FIG. 11 in accordance with aspects of the present disclosure, with the connector removed.
Figure 13:
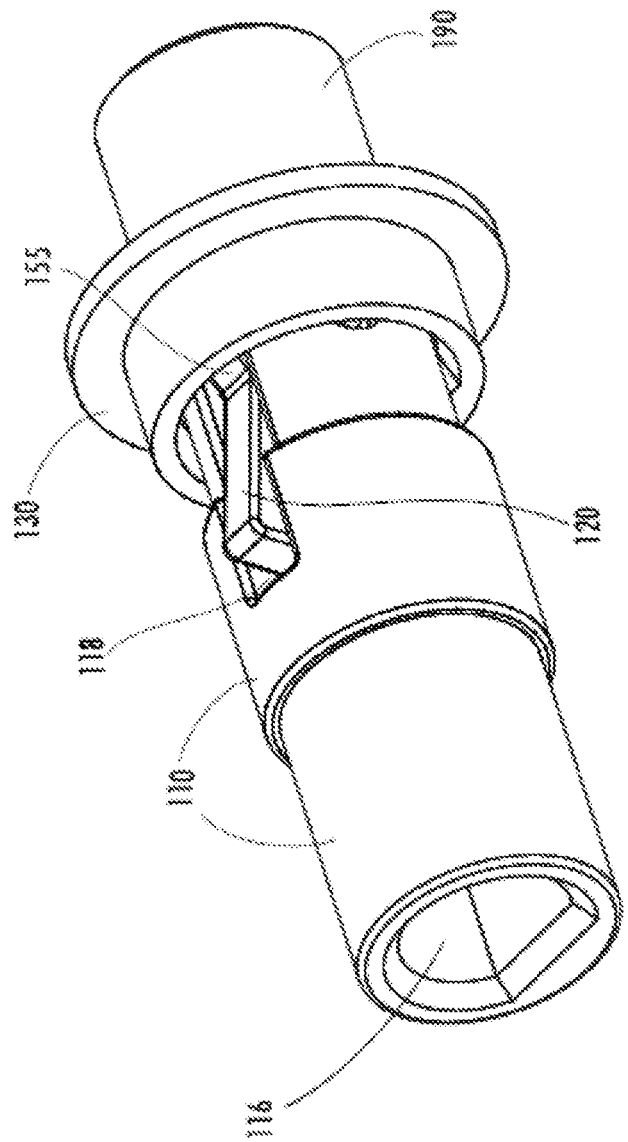
FIG. 13 depicts a perspective view of the connecting device of FIG. 11 in accordance with aspects of the present disclosure, wherein a part of the drive shaft is removed in accordance with aspects of the present disclosure.
Figure 14:
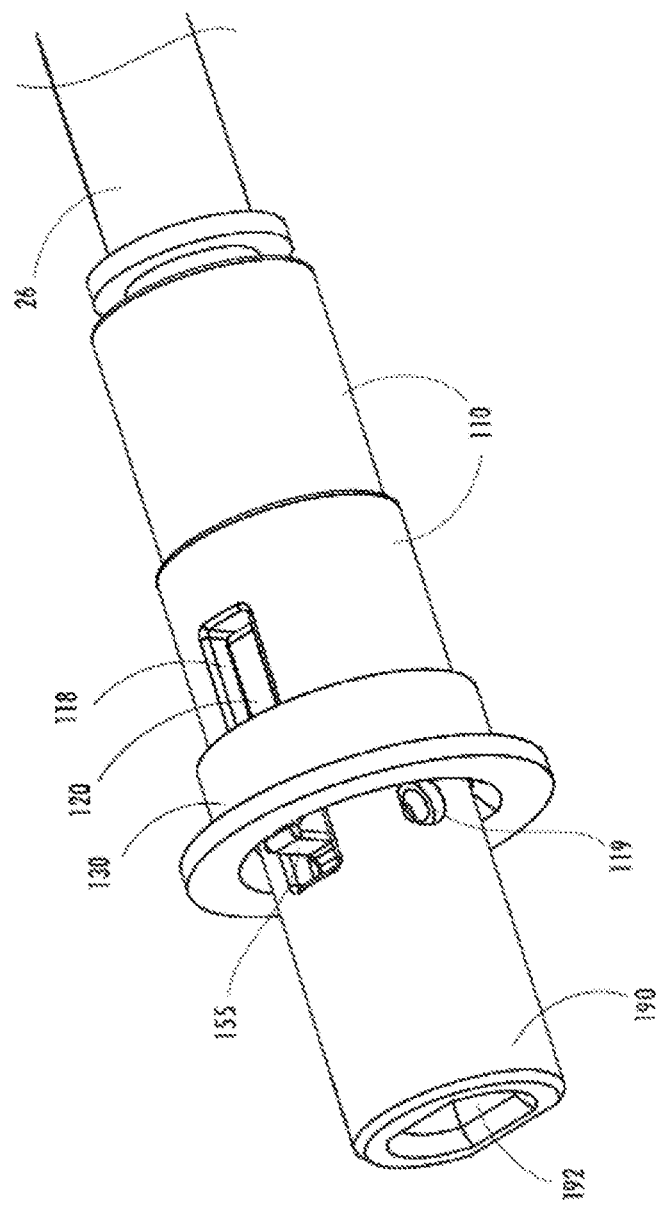
FIG. 14 depicts a perspective view of a second embodiment of the connecting device of the tool assembly in accordance with aspects of the present disclosure, wherein a part of the drive shaft of the tool head is shown, and wherein the latch is in the locked position.

As such, the user can operate the protruding end of the actuating part 150 to pivot the actuating part 150 and drive the drive part 130 to move along the longitudinal direction. Referring to FIGS. 8-9, in some embodiments, the actuating part 150 is configured to engage with a drive button 200 movably arranged on the housing of the tool. The actuating part 150 is configured to allow pivoting under the drive of the drive button 200. As such, the user can drive the actuating part 150 (e.g., an elastic actuating part 153) by moving the button 200, such as to pivot and drive the drive part 130 to move along the longitudinal direction.

In various embodiments, coupler shaft 110 is attached to output shaft 16 such that coupler shaft 110 rotates along an axis extending along longitudinal direction 103. Collar 130, latch 120, and drive shaft 26 each rotate with coupler shaft 110 when collar 130, latch 120, and drive shaft 26 are connected to coupler shaft 110. Latch 120 and drive shaft 26 may extend through opening 154 of member 150 and allow free rotation of latch 120 and drive shaft 26. In some embodiments, member 150 is configured to not contact collar 130 when at rest, such as when a user removes force or otherwise disengages from contact with member 150. Accordingly, collar 130 may rotate without contacting member 150. In still some embodiments, at least a portion of member 150, such as a collar-contacting portion of notch 158, is formed from a resilient and/or low friction material, such that collar 130 may freely or substantially freely rotate about longitudinal axis 103 even when collar 130 is in contact with the portion of member 150.

In some embodiments, a corresponding member-contacting portion of collar 130 may be formed of a resilient and/or low friction material, such that collar 130 may freely or substantially freely rotate about longitudinal axis 103 even when collar 130 is in contact with the portion of member 150. Rotation of collar 130 may generate spacing or a gap between collar 130, such as wall 132, and member 150, such as notch 158. In some embodiments, notch 158 is formed of a material configured to allow selective material loss when collar 130 rotates against notch 158 to provide a spacing or gap such as described herein.

In various embodiments, coupler shaft 110 forms cavity 112 having a keyed cross-section within coupler shaft 110. In some embodiments, cavity 112 forms a non-circular cross-section or partial-circular cross-section within coupler shaft 110. For instance, cavity 112 may form a substantially circular cross-section having a chord cut through to form an asymmetric or partially circular or D-shaped cross-section within coupler shaft 110. Other cross-sectional profiles may also be formed, such as, but not limited to, polygonal profiles, semi-circular profiles, star profiles, or other geometries. In various embodiments, an outer surface 260 of drive shaft 26 corresponds to the keyed cross-section within the coupler shaft 110. In some embodiments, outer surface 260 may form an asymmetric or particular circular or D-shaped profile corresponding to cavity 112. However, it should be appreciated that shaft 26 may form any appropriate profile that corresponds to cavity 112 and is configured to be received within coupler shaft 110 at cavity 112. Embodiments of corresponding cross sections and profiles provided herein may promote torque transfer from transmission assembly 40 through coupler shaft 110 and drive shaft 26. Keyed connections such as described herein may promote a user aligning drive shaft 26 within cavity 112 such that notch 120 may be secured within groove 262. Such keyed connections may secure tool head 20 to tool assembly 10. Such keyed connections may limit or eliminate relative movement between drive shaft 26 and coupler shaft 110.

Referring to FIG. 6, in some embodiments, the tool includes a housing 170. An actuator opening 178 is formed on the housing 170. The actuating part 150 protrudes from the actuator opening 178 to form a protruding end. In various embodiments, the user may operate the protruding end of the actuating part 150 to pivot the actuating part 150 and drive the drive part 130 to move along the longitudinal direction. Referring to FIGS. 8-9, in some embodiments, a movable drive button 200 is provided on the housing 170. The actuating part 150 engages with the drive button 200. The actuating part 150 is configured to allow pivoting under the drive of the drive button 200. As such, by moving the button 200, the user may drive the actuating part 150, for example, an elastic actuating part 153, to pivot and drive the drive part 130 to move along the longitudinal direction.

In some embodiments, apparatus 100 includes a stop wall 180 positioned at the first end 101 at coupler shaft 110. Stop wall 180 may form a bushing or other wall extending radially outward from coupler shaft 110. In some embodiments, wall 180 is configured to be positioned adjacent to a side of housing 170, such as depicted in FIG. 6. Wall 180 may form a seal configured to discourage or prevent fluid flow between housing 170 and coupler shaft 110. Stop wall 180 may rotate with coupler shaft 110.

Figure 7:
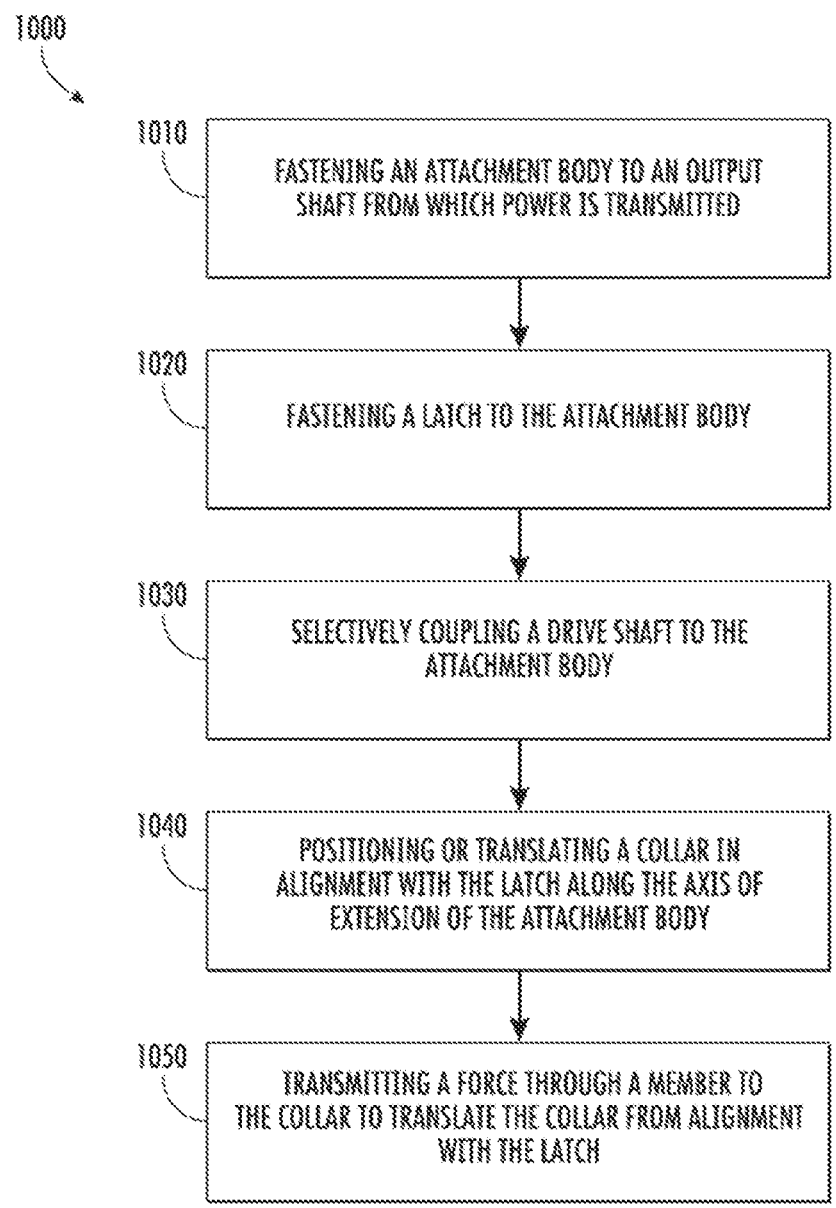
FIG. 7 outlines steps of a method for assembling or operating an attachment apparatus in accordance with aspects of the present disclosure.

Referring now to FIG. 7, a flowchart outlining steps for an embodiment of a method for assembly or operation of an attachment apparatus for a tool assembly is provided (hereinafter, "method 1000"). Embodiments of the method 1000 provided herein may be utilized for a motorized tool (e.g., electric or gas motor) or a hand-powered tool. The tool assembly may include an auger tool or other tool bit.

Embodiments of the method 1000 include at 1010 fastening an attachment body (e.g., coupler shaft 110) to an output shaft (e.g., output shaft 16) from which power is transmitted. In some embodiments, method 1000 at 1010 includes extending a fastener (e.g., first fastener) co-directional to an extension of the output shaft to fasten the attachment body to the output shaft. In still some embodiments, method 1000 at 1010 includes extending a fastener within the attachment body co-directional to an extension of the output shaft to fasten the attachment body to the output shaft. In still various embodiments, fastening the attachment body to the output shaft allows co-rotation of the output shaft and the attachment body.

Method 1000 may include at 1020 fastening a latch (e.g., latch 120) to the attachment body (e.g., coupler shaft 110). In some embodiments, method 1000 at 1020 includes extending a fastener (e.g., second fastener) substantially perpendicular or oblique to an extension of the first fastener through the attachment body and the latch. In still some embodiments, method 1000 at 1020 includes extending a fastener through the attachment body and the latch. In various embodiments, the latch fastened to the attachment body is allowed to rotate with the attachment body, such as described in regard to method 1000 at 1010. In still various embodiments, fastening the latch at the attachment body allows for the latch to pivot or rotate relative to an axis of extension of the fastener (e.g., second fastener).

Method 1000 may include at 1030 selectively coupling a drive shaft (e.g., drive shaft 26) to the attachment body (e.g., coupler shaft 110). In some embodiments, method 1000 at 1030 includes rotating or pivoting the latch into a groove (e.g., groove 2620 at the drive shaft. In still some embodiments, method 1000 at 1030 includes rotating or pivoting the latch along the axis of the fastener (e.g., second fastener) to selectively position the latch within the groove at the drive shaft. In various embodiments, method 1000 includes at 1032 extending the drive shaft into the attachment body co-directional to an axis of extension of the attachment body. In still various embodiments, the axis of extension of the attachment body is substantially perpendicular or oblique to the axis of extension of the fastener (e.g., second fastener) extending through the latch and the attachment body. In still yet various embodiments, the axis of extension of the attachment body is substantially co-directional to the extensions of the fastener (e.g., first fastener) to the output shaft.

Method 1000 may include at 1040 positioning or translating a collar (e.g., collar 130) in alignment with the latch along the axis of extension of the attachment body. In some embodiments, method 1000 at 1040 includes sliding the collar along the axis of extension of the attachment body and around the latch when the latch is rotated into the groove at the drive shaft.

Method 1000 may include at 1050 transmitting a force through a member (e.g., member 150) to the collar to translate the collar from alignment with the latch. In some embodiments, method 1000 at 1050 includes pivoting or rotating the member along an axis extending substantially co-directional to the axis of extension of the fastener (e.g., second fastener) through the latch and the attachment body. In still some embodiments, method 1000 at 1050 includes applying the force in a direction opposite of a biasing force (e.g., a force opposite of spring 140) to translate the collar.

In various embodiments, method 1000 includes at 1052 allowing the biasing force to position the collar around the latch. In some embodiments, method 1000 at 1052 includes discontinuing or reducing the force applied at 1050 to allow the biasing force to act against the collar to translate or position the collar around the latch. In still some embodiments, method 1000 includes at 1054 applying a force to the collar to rotate the latch into the groove at the drive shaft. In various embodiments, applying the force to the collar includes positioning or translating the collar to the latch to rotate the latch to lock the drive shaft within the attachment body. In still various embodiments, applying the force at 1054 includes a biasing force from a spring (e.g., spring 140) or a user applying a force along an axis of extension of the attachment body.

Embodiments of tool assembly 10, apparatus 100, or method 1000 provided herein provide a lock assembly for selectively attaching and detaching tool head 20 to tool assembly 10. Embodiments of apparatus 100 may furthermore provide a lock and key assembly allowing a user to quickly and safely pull member 150 (e.g., a lever), insert or remove the tool head 20 (e.g., an auger, a machine bit, or other appropriate tool), and release member 150 to position and lock the tool head 20 in place at drive shaft 26. Embodiments of tool assembly 10 and apparatus 100 provided herein may allow selective tool heads to be positioned, such as may mitigate attachment of undesired or inappropriate tools, and mitigate operational, performance, and safety risks associated with mixing incompatible or undesirable combinations of tool heads and tools.

Further aspects of the invention are provided by one or more of the following clauses:

1. An attachment apparatus for a tool, the apparatus defining a mutually orthogonal reference longitudinal direction, transverse direction, and lateral direction and a first end and a second end separated along the longitudinal direction, the apparatus including a latch including a notch configured to extend into a groove at a tool head; a coupler extending along the longitudinal direction, the coupler having a cavity extending along the longitudinal direction, wherein a tool end opening is formed at the first end through which a portion of the tool head may extend into the cavity along the longitudinal direction, the coupler having a latch opening extending along the longitudinal direction and into the cavity, wherein the latch is positioned in the cavity through the latch opening; and a collar extending at least partially around the coupler, wherein the collar is articulatable along the longitudinal direction about the latch opening.
2. The apparatus of any one or more clauses herein, wherein the coupler forms a first opening extending along the transverse direction and the latch forms a second opening extending along the transverse direction, the latch coupled to the coupler at an alignment along the longitudinal direction of the first opening and the second opening.
3. The apparatus of any one or more clauses herein, wherein the latch is pivotally coupled to the coupler to allow translation of the notch along the lateral direction.
4. The apparatus of any one or more clauses herein, the apparatus including a fastener extending through the first opening and the second opening along the transverse direction, the fastener coupling the latch to the coupler in pivoting arrangement.
5. The apparatus of any one or more clauses herein, the latch including an arm positioned along the longitudinal direction between a latch end extending along the longitudinal direction toward the second end and the notch positioned along the longitudinal direction toward the first end, the arm extending at least partially along the lateral direction to position the latch end within the cavity.
6. The apparatus of any one or more clauses herein, further including the tool head having the groove, wherein the tool head includes a drive shaft having the groove, the drive shaft forming an end portion extending at least partially along the lateral direction corresponding to extension of the arm at the latch.
7. The apparatus of any one or more clauses herein, wherein the end portion at the drive shaft and the arm at the latch are each sloped, and wherein the end portion is positioned along the longitudinal direction between the notch and the arm at the latch when the notch is positioned in the groove at the drive shaft.
8. The apparatus of any one or more clauses herein, the apparatus including a spring extending along the longitudinal direction between the collar and a radially extending surface of the coupler.
9. The apparatus of any one or more clauses herein, wherein the spring biases the collar adjacent to at least a portion of the latch such that at least a portion of the latch is prevented from traveling out of the cavity through the latch opening.
10. The apparatus of any one or more clauses herein, the apparatus including a member configured to pivot about the transverse direction to displace the collar along longitudinal direction, wherein pivoting of the member contacts the member against the collar along the longitudinal direction.
11. The apparatus of any one or more clauses herein, the member including a wall forming a wall opening through which the coupler extends along the longitudinal direction, wherein the member pivots about a transverse location offset along the lateral direction from where the member contacts the collar.
12. The apparatus of any one or more clauses herein 9, further including a spring extending along the longitudinal direction between the collar and a radially extending surface of the coupler, wherein the spring biases the collar adjacent to at least a portion of the latch such that at least a portion of the latch is prevented from traveling out of the cavity through the latch opening, and wherein the wall is configured to displace the collar along the longitudinal direction against the bias force such that upon application of sufficient force the collar is moved away from the latch such that the latch is able to travel out of the cavity through the latch opening.
13. The apparatus of any one or more clauses herein, wherein the cavity of the coupler is non-symmetrical along the transverse direction or the lateral direction.
14. The apparatus of any one or more clauses herein, further including the tool head having the groove, wherein a drive shaft of the tool head has the groove, and wherein the drive shaft is non-symmetrical along the transverse direction or the lateral direction, and wherein the drive shaft corresponds to a shape of the cavity.
15. The apparatus of any one or more clauses herein, further including the tool head having the groove, wherein a drive shaft of the tool head has the groove, and wherein the tool head is secured to the coupler when both the notch extends into the groove and the collar is positioned adjacent to at least a portion of the latch.
16. The apparatus of any one or more clauses herein, wherein the tool head is not secured to the coupler when the collar is positioned away from at least a portion of the latch along the longitudinal direction.
17. The apparatus of any one or more clauses herein, wherein the tool is an auger and the tool head is an auger bit.
18. A tool assembly, the tool assembly defining a mutually orthogonal reference longitudinal direction, transverse direction, and lateral direction and a first end and a second end separated along the longitudinal direction, the tool assembly including a power unit configured to output energy through an output shaft; a latch including a notch configured to extend into a groove at a portion of a tool head; a coupler extending along the longitudinal direction and connected to the output shaft of the power unit, the coupler having a cavity extending along the longitudinal direction, wherein a tool end opening is formed at the first end through which the portion of the tool head may extend into the cavity along the longitudinal direction, the coupler having a latch opening extending along the longitudinal direction and into the cavity, wherein the latch is positioned in the cavity through the latch opening; and a collar extending at least partially around the coupler, wherein the collar is articulatable along the longitudinal direction about the latch opening.
19. The tool assembly of any one or more clauses herein, wherein the power unit is powered by a battery.
20. The tool assembly of any one or more clauses herein, further including the tool head having the groove, wherein a drive shaft of the tool head has the groove, and the tool head is secured to the coupler when both the notch extends into the groove and the collar is positioned adjacent to at least a portion of the latch.
21. The tool assembly of any one or more clauses herein, the tool assembly including a housing surrounding the coupler, the housing forming an opening extending along the longitudinal direction, the housing forming a pin opening extending orthogonal to the longitudinal direction; a member partially extending through the opening, the member including a wall from which a pin extends into the pin opening at the housing, wherein the member is configured to pivot relative to pin opening and translate along the longitudinal direction.

22. The tool assembly of any one or more clauses herein, wherein the end portion at the drive shaft and the arm at the latch are each sloped, and wherein the end portion is positioned along the longitudinal direction between the notch and the arm at the latch when the notch is positioned in the groove at the drive shaft.

23. The tool assembly of any one or more clauses herein, the tool assembly including a spring extending along the longitudinal direction between the collar and a surface extending radially outward from the coupler shaft.

24. The tool assembly of any one or more clauses herein, the tool assembly including a housing surrounding the coupler shaft, the housing forming an opening extending along the longitudinal direction, the housing forming a pin opening extending orthogonal to the longitudinal direction; a member partially extending through the opening, the member including a wall from which a pin extends into the pin opening at the housing, wherein the member is configured to pivot relative to pin opening and translate along the longitudinal direction.

25. The tool assembly of any one or more clauses herein, wherein a notch is formed at the wall of the member, the notch extending along the longitudinal direction toward the collar.

26. The tool assembly of any one or more clauses herein, including the attachment apparatus of any one or more clauses herein.

27. A tool including the attachment apparatus of any one or more clauses herein.

28. The tool assembly of any one or more clauses herein, the tool head forming an auger attachment.

29. A method for operation of a tool assembly, the method including fastening an attachment body to an output shaft from which power is transmitted; fastening a latch to the attachment body; selectively coupling a drive shaft to the attachment body; and positioning or translating a collar in alignment with the latch along the axis of extension of the attachment body.

30. The method of any one or more clauses herein, including transmitting a force through a member to the collar to translate the collar from alignment with the latch.

31. The tool assembly of any one or more clauses herein configured to perform the method of any one or more clauses herein.

32. The tool assembly of any one or more clauses herein including the attachment apparatus of any one or more clauses herein.

33. A connecting device for connecting a tool, wherein a longitudinal direction (103), a transverse direction (104) and a vertical direction (105) perpendicular to each other are defined for the connecting device (100), and a first end (101) and a second end (102) spaced apart are provided in the longitudinal direction, the connecting device including a connector (110), the connector (110) having an inner cavity (112) extending in the longitudinal direction, a tool end opening (116) connected to the inner cavity (112) and a latch opening (118) connected to the inner cavity (112), wherein the tool end opening (116) is configured to allow a drive shaft (26) of a tool head to pass through it into the inner cavity (112) in the longitudinal direction; a latch (120), the latch (120) being located in the inner cavity (112) and capable of moving between a locked position and an unlocked position, the latch (120) including an engaging portion (122), the engaging portion (122) being configured to engage with a corresponding mating portion (262) on the drive shaft (26) entering the inner cavity (112) in the locked position, and the engaging portion (122) being disengaged from the mating portion (262) in the unlocked position; a drive part (130), the drive part (130) being provided on the connector (110) and capable of being driven on the latch opening (118) along the longitudinal direction to drive the latch (120) to move.

34. The connecting device of any one or more clauses herein, wherein the connector (110) is formed with a first opening (119) extending along the transverse direction, and the latch (120) is formed with a second opening (129) extending along the transverse direction, wherein the latch (120) is connected to the connector (110) by use of a pivot that passes through the first opening (119) and the second opening (129).

35. The connecting device of any one or more clauses herein 2, wherein the latch (120) is pivotably arranged on the connector (110) to allow the latch (120) to be movable in the vertical direction.

36. The connecting device of any one or more clauses herein, wherein the latch (120) includes a stop end (124) extending toward the second end along the longitudinal direction and a connecting portion (126) located between the stop end (124) and the engaging portion (122), and an accommodating space for accommodating a drive shaft end (261) of the drive shaft (26) is formed between the connecting portion (126) and the engaging portion (122).

37. The connecting device of any one or more clauses herein, wherein, the connecting portion (126) includes a first inclined surface (127), and the first inclined surface (127) is configured to be capable of contacting a drive inclined surface (266) of the drive shaft end (261).

38. The connecting device of any one or more clauses herein, wherein the engaging portion (122) is formed with a second inclined surface (123), and the second inclined surface (123) is configured to be in sliding contact with the drive inclined surface (266) of the drive shaft end (261) of the drive shaft (26) when the drive shaft (26) extends into the inner cavity (112).

39. The connecting device of any one or more clauses herein, wherein, the connecting device further includes a first elastic part (140), the first elastic part (140) is arranged between the drive part (130) and a stop portion (142) of the connector (110) to store energy when the drive part (130) is driven, the first elastic part (140), when releasing energy, is capable of biasing the drive part (130) to an initial position, and, in the initial position, the drive part (130) keeps the latch (120) in the locked position.

40. The connecting device of any one or more clauses herein, wherein the connecting device further includes a pivotably arranged actuating part (150), and a pivot axis of the actuating part (150) extends along the transverse direction, wherein, the actuating part (150) is capable of driving the drive part (130) to move from the initial position to a released position under an action of an external force applied by an operator; when in the initial position, the drive part (130) keeps the latch (120) in the locked position, and when in the released position, the drive part (130) allows the latch (120) to be in the unlocked position.

41. The connecting device of any one or more clauses herein 8, wherein, the actuating part (150) includes an open mouth (154), and the connector (110) extends through the open mouth (154), wherein at least two opposite edges of the open mouth (154) contact the drive part (130).

42. The connecting device of any one or more clauses herein, wherein contact protrusions (158) in contact with the drive part (130) are respectively formed on the at least two opposite mouth edges.

43. The connecting device of any one or more clauses herein, wherein the actuating part (150) is an actuating plate (152).

44. The connecting device of any one or more clauses herein, wherein the actuating part (150) is an elastic actuating part (153).

45. The connecting device of any one or more clauses herein, wherein the latch (120) includes a latch protrusion (155), and, when the actuating part (150) drives the drive part (130) to move from the initial position to the released position, the drive part (130) drives the latch protrusion (155) to drive the latch (120) to move from the locked position to the unlocked position.

46. The connecting device of any one or more clauses herein, wherein a second elastic part (106) acting on the latch (120) is provided in the inner cavity (112), wherein the second elastic part (106) stores energy when the latch (120) moves from the locked position to the unlocked position, wherein the second elastic part (106), when releasing energy, biases the latch (120) to the locked position.

47. The connecting device of any one or more clauses herein, wherein a connector power input end (190) of the connector (110) has a connecting part (191), and the connecting part (191) is configured to securely connect the connector power input end (190) to an upstream power output end, wherein a part of the second elastic part (106) serves as a connecting gasket of the connecting part (191).

48. The connecting device of any one or more clauses herein, wherein the second elastic part (106) is a U-shaped elastic piece, one elastic side wall (161) of the U-shaped elastic piece acts on the stop end (124) of the latch (120), another elastic side wall (161) of the U-shaped elastic piece is used as a supporting side wall, and a bottom wall (162) of the U-shaped elastic piece is used as the connecting gasket, wherein, a mounting hole (163) is formed on the bottom wall, and the connecting part (191) passes through the mounting hole (163) and extends toward the second end along the longitudinal direction in the inner cavity (112).

49. The connecting device of any one or more clauses herein, wherein an accommodating channel (192) is formed on an end surface of the connector power input end (190), the accommodating channel is configured to accommodate a power output shaft (16) upstream of power transmission, a through hole is formed on a spacer side wall (111) between the accommodating channel (192) and the inner cavity (112), and the connecting part (191) extends from the inner cavity (112) through the through hole into the accommodating channel (192) to connect to the power output shaft (16), so that the connector (110) and the power output shaft (16) are connected to each other.

50. The connecting device of any one or more clauses herein, wherein the actuating part (150) is configured to protrude from an actuator opening (178) in a housing (170) of the tool; alternatively, the actuating part (150) is configured to engage with a drive button (200) movably arranged on a housing of the tool, and the actuating part (150) is capable of pivoting under the drive of the drive button (200).

51. A tool, wherein the tool includes a power unit, the power unit outputting power through a power output shaft (16); the connecting device (100) of any one or more clauses herein, wherein the power output shaft (16) and the connector (110) are connected in a power transmitting manner.

52. The tool of any one or more clauses herein, wherein, the tool further includes a detachably installed battery unit (12), and the battery unit (12) provides driving power to a driving motor of the power unit.

53. The tool of any one or more clauses herein, wherein the tool includes a tool head (20), and a drive shaft (26) of the tool head (20) passes through the tool end opening (116) into the inner cavity (112) in the longitudinal direction, wherein, the mating portion (262) of the drive shaft (26) engages with the engaging portion (122) in the locked position, and the engaging portion (122) is disengaged from the mating portion (262) in the unlocked position.

54. The tool of any one or more clauses herein, wherein the tool head (20) is an auger bit.

55. The tool of any one or more clauses herein, wherein the tool includes a housing (170), an actuator opening (178) is formed on the housing (170), and an actuating part (150) protrudes from the actuator opening (178); or, a movable drive button (200) is provided on the housing (170), an actuating part (150) engages with the drive button (200), and the actuating part (150) is capable of pivoting under the drive of the drive button (200).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An attachment apparatus for a tool, the apparatus defining a mutually orthogonal reference longitudinal direction, transverse direction, and lateral direction and a first end and a second end separated along the longitudinal direction, the apparatus comprising:
   a latch comprising a notch configured to extend into a groove at a tool head, the latch comprising an arm positioned along the longitudinal direction between a latch end and the notch, the latch end positioned along the longitudinal direction more proximate than the notch to the second end;
   a coupler extending along the longitudinal direction, the coupler having a cavity extending along the longitudinal direction, wherein a tool end opening is formed at the first end through which a portion of the tool head may extend into the cavity along the longitudinal direction, the coupler having a latch opening extending along the longitudinal direction and into the cavity, wherein the latch is positioned in the cavity through the latch opening, the arm of the latch extending along the longitudinal direction within the cavity; and a collar extending at least partially around the coupler, wherein the collar is articulatable along the longitudinal direction about the latch opening.

2. The apparatus of claim 1, wherein the coupler forms a first opening extending along the transverse direction and the latch forms a second opening extending along the transverse direction, the latch coupled to the coupler at an alignment along the longitudinal direction of the first opening and the second opening.

3. The apparatus of claim 2, wherein the latch is pivotally coupled to the coupler to allow translation of the notch along the lateral direction.

4. The apparatus of claim 2, the apparatus comprising:
a fastener extending through the first opening and the second opening along the transverse direction, the fastener coupling the latch to the coupler in pivoting arrangement.

5. The apparatus of claim 1, the arm extending at least partially along the lateral direction to position the latch end within the cavity.

6. The apparatus of claim 5, further comprising the tool head having the groove, wherein the tool head comprises a drive shaft having the groove, the drive shaft forming an end portion extending at least partially along the lateral direction corresponding to extension of the arm at the latch.

7. The apparatus of claim 6, wherein the end portion at the drive shaft and the arm at the latch are each sloped, and wherein the end portion is positioned along the longitudinal direction between the notch and the arm at the latch when the notch is positioned in the groove at the drive shaft.

8. The apparatus of claim 1, the apparatus comprising:
a spring extending along the longitudinal direction between the collar and a radially extending surface of the coupler.

9. The apparatus of claim 8, wherein the spring biases the collar adjacent to at least a portion of the latch such that at least a portion of the latch is prevented from traveling out of the cavity through the latch opening.

10. The apparatus of claim 9, further comprising:
a spring extending along the longitudinal direction between the collar and a radially extending surface of the coupler, wherein the spring biases the collar adjacent to at least a portion of the latch such that at least a portion of the latch is prevented from traveling out of the cavity through the latch opening, and wherein the wall is configured to displace the collar along the longitudinal direction against the bias force such that upon application of sufficient force the collar is moved away from the latch such that the latch is able to travel out of the cavity through the latch opening.

11. The apparatus of claim 10, further comprising:
the tool head having the groove, wherein a drive shaft of the tool head has the groove, and wherein the drive shaft is non-symmetrical along the transverse direction or the lateral direction, and wherein the drive shaft corresponds to a shape of the cavity.

12. The apparatus of claim 1, the apparatus comprising:
a member configured to pivot about the transverse direction to displace the collar along longitudinal direction, wherein pivoting of the member contacts the member against the collar along the longitudinal direction.

13. The apparatus of claim 12, the member comprising:
a wall forming a wall opening through which the coupler extends along the longitudinal direction, wherein the member pivots about a transverse location offset along the lateral direction from where the member contacts the collar.

14. The apparatus of claim 1, wherein the cavity of the coupler is non-symmetrical along the transverse direction or the lateral direction.

15. The apparatus of claim 1, further comprising:
the tool head having the groove, wherein a drive shaft of the tool head has the groove, and wherein the tool head is secured to the coupler when both the notch extends into the groove and the collar is positioned adjacent to at least a portion of the latch.

16. The apparatus of claim 15, wherein the tool head is not secured to the coupler when the collar is positioned away from at least a portion of the latch along the longitudinal direction.

17. A tool assembly, the tool assembly defining a mutually orthogonal reference longitudinal direction, transverse direction, and lateral direction and a first end and a second end separated along the longitudinal direction, the tool assembly comprising:
a power unit configured to output energy through an output shaft;
a latch comprising a notch configured to extend into a groove at a portion of a tool head, the latch comprising an arm positioned along the longitudinal direction between a latch end and the notch, the latch end positioned along the longitudinal direction more proximate than the notch to the second end;
a coupler extending along the longitudinal direction and connected to the output shaft of the power unit, the coupler having a cavity extending along the longitudinal direction, wherein a tool end opening is formed at the first end through which the portion of the tool head may extend into the cavity along the longitudinal direction, the coupler having a latch opening extending along the longitudinal direction and into the cavity, wherein the latch is positioned in the cavity through the latch opening, the arm of the latch extending along the longitudinal direction within the cavity; and
a collar extending at least partially around the coupler, wherein the collar is articulatable along the longitudinal direction about the latch opening.

18. The tool assembly of claim 17, wherein the power unit is powered by a battery.

19. The tool assembly of claim 17, further comprising the tool head having the groove, wherein a drive shaft of the tool head has the groove, and the tool head is secured to the coupler when both the notch extends into the groove and the collar is positioned adjacent to at least a portion of the latch.

20. The tool assembly of claim 19, wherein the tool is an auger and the tool head is an auger bit.

21. The tool assembly of claim 17, the tool assembly comprising:
a housing surrounding the coupler, the housing forming an opening extending along the longitudinal direction, the housing forming a pin opening extending orthogonal to the longitudinal direction;
a member partially extending through the opening, the member comprising a wall from which a pin extends into the pin opening at the housing, wherein the member is configured to pivot relative to the pin opening and translate along the longitudinal direction.

* * * * *